United States Patent
Vidyakina et al.

(10) Patent No.: US 11,805,391 B2
(45) Date of Patent: Oct. 31, 2023

(54) METHOD, APPARATUS, AND COMPUTER PROGRAM PRODUCT FOR ANONYMIZING TRAJECTORIES

(71) Applicant: HERE GLOBAL B.V., Eindhoven (NL)

(72) Inventors: Elena Vidyakina, Berlin (DE); Gavin Brown, Berlin (DE); Elena Mumford, Eindhoven (NL); Ori Dov, Berlin (DE); Olivier Dousse, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 29 days.

(21) Appl. No.: 17/303,684

(22) Filed: Jun. 4, 2021

(65) Prior Publication Data
US 2022/0394425 A1    Dec. 8, 2022

(51) Int. Cl.
*H04W 4/02*    (2018.01)
(52) U.S. Cl.
CPC ................... *H04W 4/026* (2013.01)
(58) Field of Classification Search
CPC .................................................. H04W 4/026
See application file for complete search history.

(56) References Cited

U.S. PATENT DOCUMENTS

| | | | |
|---|---|---|---|
| 2012/0270565 A1* | 10/2012 | Yang | H04W 4/029 455/456.3 |
| 2013/0261954 A1 | 10/2013 | Boschker et al. | |
| 2017/0358204 A1* | 12/2017 | Modica | G08G 1/0141 |
| 2018/0268168 A1 | 9/2018 | Herlocker et al. | |
| 2019/0049255 A1* | 2/2019 | Chai | G08G 1/123 |
| 2019/0050624 A1* | 2/2019 | Chai | G06N 3/08 |
| 2019/0272389 A1 | 9/2019 | Viente et al. | |
| 2020/0025584 A1* | 1/2020 | Fowe | G08G 1/0112 |
| 2020/0068350 A1* | 2/2020 | Chai | G06N 5/003 |
| 2022/0268591 A1* | 8/2022 | Max | G01C 21/3461 |

OTHER PUBLICATIONS

Anonymization and De-Anonymization of Mobility Trajectories: Dissecting the Gaps Between Theory and Practice (Year: 2021).*

(Continued)

*Primary Examiner* — Ernest G Tacsik
(74) *Attorney, Agent, or Firm* — Alston & Bird LLP

(57) ABSTRACT

Embodiments described herein relate to anonymizing of trajectories of mobile devices. Methods may include: receiving an input chunk of probe data points, where the input chunk includes probe data points spanning an input duration, where the input chunk represents at least a first input portion of a trajectory; generating, based at least in part on the input chunk, an output chunk of one or more probe data points, where the output chunk includes one or more probe data points spanning an output duration, where the output duration is different from the input duration, where the output chunk represents at least an output portion of the trajectory, where the first input portion of the trajectory and the output portion of the trajectory share at least a common portion of the trajectory; and providing the output chunk of one or more probe data points to a location-based service provider.

15 Claims, 21 Drawing Sheets

(56) References Cited

OTHER PUBLICATIONS

Kamat et al., "Temporal Privacy in Wireless Sensor Networks", 27th International Conference on Distributed Computing Systems (ICDCS '07), (Jun. 25-27, 2007), 8 pages.

Lu et al., "Frequency Based Chunking for Data De-Duplication", 2010 18th Annual IEEE/ACM International Symposium on Modeling, Analysis and Simulation of Computer and Telecommunication Systems, (Aug. 17-19, 2010), 10 pages.

Tu et al., "A New Privacy Breach: User Trajectory Recovery from Aggregated Mobility Data", IEEE/ACM Transactions on Networking, vol. 26, Issue 3, (May 8, 2018), 15 pages.

U.S. Appl. No. 17/088,240, filed Nov. 3, 2020; In re: Bennati et al., entitled "Method, Apparatus, and Computer Program Product for Anonymizing Trajectories", 45 pages.

Yanga et al., "A Novel Temporal Perturbation Based Privacy-Preserving Scheme for Real-Time Monitoring Systems", Computer Networks, (Aug. 26, 2015), 35 pages.

Extended European Search Report for European Application No. 22176613.2 dated Nov. 4, 2022, 11 pages.

\* cited by examiner

METHOD, APPARATUS, AND COMPUTER PROGRAM PRODUCT FOR ANONYMIZING TRAJECTORIES

TECHNOLOGICAL FIELD

An example embodiment of the present disclosure relates to anonymizing trajectories of mobile devices, and more particularly, to enhancing the anonymization of trajectories that are segmented and gapped by introducing additional anonymizing factors that render it difficult to determine a source of the trajectory.

BACKGROUND

Service providers and device manufacturers (e.g., wireless, cellular, navigation, etc.) are continually challenged to deliver value and convenience to consumers by providing compelling and useful services. Location-based services have been developed to provide users with useful and relevant information regarding route planning and to facilitate route guidance along the way. Substantially static data regarding roadways is used in conjunction with dynamic data, such as traffic, construction, and incident information to provide accurate and timely information to a driver to help route planning and decision making.

Data received from infrastructure monitoring systems and crowd-sourced data has become ubiquitous and may be available for facilitating route guidance and navigation system information. However, this data can be mined to provide various other services to users and to grow the availability of location-based services. The provision of location-based services is dependent upon understanding the location of a user requesting the services. Maintaining anonymity while also being able to access location-based services is a challenge.

BRIEF SUMMARY

A method, apparatus, and computer program product are provided in accordance with an example embodiment described herein for anonymizing trajectories of mobile devices, and more particularly, to enhancing the anonymization of trajectories that are segmented and gapped by introducing additional anonymizing factors that render it difficult to determine a source of the trajectory. According to an example embodiment, an apparatus is provided including at least one processor and at least one memory including computer program code, the at least one memory and computer program code configured to, with the processor, cause the apparatus to at least: receive an input chunk of probe data points, where the input chunk includes probe data points spanning an input duration, where the input chunk of probe data points represents a first input portion of a trajectory; generate, based at least in part on the input chunk of probe data points, an output chunk of one or more probe data points, where the output chunk includes one or more probe data points spanning an output duration, where the output duration is different from the input duration, where the output chunk of one or more probe data points represents at least an output portion of the trajectory, where the first input portion of the trajectory and the output portion of the trajectory share at least a common portion of the trajectory; and provide the output chunk of one or more probe data points to a location-based service provider, where the location-based service provider provides at least one service based, at least in part, on the trajectory.

According to some embodiments, the input chunk of probe data points includes a starting probe data point and an ending probe data point, where the output chunk of one or more probe data points includes at least one different starting probe data point or ending probe data point. According to some embodiments, causing the apparatus to provide the output chunk of one or more probe data points to a location-based service provider includes causing the apparatus to introduce a delay before providing the output chunk of one or more probe data points to a location-based service provider. The delay of some embodiments includes a delay less than a latency defined by the location-based service provider. The output chunk of one or more probe data points of some embodiments includes an output chunk of one probe data point, and where the output chunk of one probe data point is provided at a release time equal to a timestamp of the one probe data point added to the input duration and a processing time duration.

The input chunk of probe data points of some embodiments includes a first input chunk of probe data points, where the apparatus is further caused to: receive a second input chunk of probe data points, where the second input chunk includes probe data points spanning the input duration, where the second input chunk of probe data points represents at least a second input portion of the trajectory; where causing the apparatus to generate the output chunk of one or more probe data points includes causing the apparatus to generate the output chunk of one or more probe data points based, at least in part, on the first input chunk of probe data points and the second input chunk of probe data points, where the output chunk of one or more probe data points includes at least one probe data point from each of the first input chunk of probe data points and the second input chunk of probe data points. The output chunk of some embodiments includes less than all of the probe data points from at least one of the first input chunk of probe data points and the second input chunk of probe data points. According to some embodiments, the input chunk of probe data points is received from a mobile device, and the location-based service provider provides at least one location-based service to at least one other mobile device.

Embodiments provided herein include a computer program product having at least one non-transitory computer-readable storage medium having computer-executable program code portions stored therein, the computer-executable program code portions including program code instructions configured to: receive an input chunk of probe data points, where the input chunk includes probe data points spanning an input duration, where the input chunk of probe data points represents at least a first input portion of a trajectory; generate, based at least in part on the input chunk of probe data points, an output chunk of one or more probe data points, where the output chunk includes one or more probe data points spanning an output duration, where the input chunk of probe data points includes a starting probe data point and an ending probe data point, where the output chunk of one or more probe data points includes at least one different starting probe data point or ending probe data point, where the output chunk of one or more probe data points represents at least an output portion of the trajectory, where the first input portion of the trajectory and the output portion of the trajectory share at least a common portion of the trajectory; and provide the output chunk of the one or more probe data points to a location-based service provider, where the location-based service provider provides at least one service based, at least in part, on the trajectory."

According to some embodiments, the output duration is different from the input duration. The program code instructions to provide the output chunk of one or more probe data points to a location-based service provider includes, in some embodiments, program code instructions to introduce a delay before providing the output chunk of one or more probe data points to a location-based service provider. The delay can include a delay less than a latency defined by the location-based service provider. The output chunk of one or more probe data points includes, in some embodiments, an output chunk of one probe data point, and the output chunk of one probe data point is provided at a release time equal to a timestamp of the one probe data point added to the input duration and a processing time duration.

According to some embodiments, the input chunk of probe data points includes a first input chunk of probe data points, the computer program product further including program code instructions to: receive a second input chunk of probe data points, where the second input chunk includes probe data points spanning the input duration, where the second input chunk of probe data points represents at least a second input portion of a trajectory; where the program code instructions to generate the output chunk of one or more probe data points further includes program code instructions to generate the output chunk of one or more probe data points based, at least in part, on the first input chunk of probe data points and the second input chunk of probe data points, where the output chunk of one or more probe data points includes at least one probe data point from each of the first input chunk of probe data points and the second input chunk of probe data points. According to some embodiments, the output chunk includes less than all of the probe data points from at least one of the first input chunk of probe data points and the second input chunk of probe data points. The input chunk of probe data points is received, in some embodiments, from a mobile device, where the location-based service provider provides at least one location-based service to at least one other mobile device.

Embodiments provided herein include a method including: receiving an input chunk of probe data points, where the input chunk includes probe data points spanning an input duration, where the input chunk of probe data points represents at least a first input portion of a trajectory; generating, based at least in part on the input chunk of probe data points, an output chunk of one or more probe data points, where the output chunk includes one or more probe data points spanning an output duration, where the output duration is different from the input duration, where the output chunk of one or more probe data points represents at least an output portion of the trajectory, where the first input portion of the trajectory and the output portion of the trajectory share at least a common portion of the trajectory; and providing the output chunk of one or more probe data points to a location-based service provider, where the location-based service provider provides at least one service based, at least in part, on the trajectory. The input chunk of probe data points in some embodiments includes a starting probe data point and an ending probe data point, where the output chunk of one or more probe data points includes at least one different starting probe data point or ending probe data point.

According to some embodiments, providing the output chunk of one or more probe data points to a location-based service provider includes introducing a delay before providing the output chunk of one or more probe data points to a location-based service provider. According to some embodiments, the input chunk of probe data points includes a first input chunk of probe data points, the method further including: receiving a second input chunk of probe data points, where the second input chunk includes probe data points spanning the input duration, where the second input chunk of probe data points represents at least a second input portion of the trajectory; where generating the output chunk of one or more probe data points further includes generating the output chunk of one or more probe data points based, at least in part, on the first input chunk of probe data points and the second input chunk of probe data points, where the output chunk of one or more probe data points includes at least one probe data point from each of the first input chunk of probe data points and the second input chunk of probe data points.

According to some embodiments, the output chunk of one or more probe data points includes an output chunk of one probe data point, and the output chunk of one probe data point is provided at a release time equal to a timestamp of the one probe data point added to the input duration and a processing duration. The input chunk of probe data points includes a first input chunk of probe data points in some embodiments, where the method includes receiving a second input chunk of probe data points, where the second input chunk includes probe data points spanning the input duration, where the second input chunk of probe data points represents at least a second input portion of the trajectory, where generating the output chunk of one or more probe data points includes generating the output chunk of one or more probe data points based, at least in part, on the first input chunk of probe data points and the second input chunk of probe data points, where the output chunk of one or more probe data points includes at least one probe data point from each of the first input chunk of probe data points and the second input chunk of probe data points. The output chunk of some embodiments includes less than all of the probe data points from at least one of the first input chunk of probe data points and the second input chunk of probe data points. The input chunk of probe data points of some embodiments is received from a mobile device, and the location-based service provider provides at least one location-based service to at least one other mobile device.

Embodiments provided herein include an apparatus including: means for receiving an input chunk of probe data points, where the input chunk includes probe data points spanning an input duration, where the input chunk of probe data points represents at least a first input portion of a trajectory; means for generating, based at least in part on the input chunk of probe data points, an output chunk of one or more probe data points, where the output chunk includes one or more probe data points spanning an output duration, where the output duration is different from the input duration, where the output chunk of one or more probe data points represents at least an output portion of the trajectory, where the first input portion of the trajectory and the output portion of the trajectory share at least a common portion of the trajectory; and means for providing the output chunk of one or more probe data points to a location-based service provider, where the location-based service provider provides at least one service based, at least in part, on the trajectory. The input chunk of probe data points in some embodiments includes a starting probe data point and an ending probe data point, where the output chunk of one or more probe data points includes at least one different starting probe data point or ending probe data point.

According to some embodiments, the means for providing the output chunk of one or more probe data points to a location-based service provider includes means for introducing a delay before providing the output chunk of one or more probe data points to a location-based service provider.

According to some embodiments, the input chunk of probe data points includes a first input chunk of probe data points, the apparatus further including: means for receiving a second input chunk of probe data points, where the second input chunk includes probe data points spanning the input duration, where the second input chunk of probe data points represents at least a second input portion of the trajectory; where the means for generating the output chunk of one or more probe data points further includes means for generating the output chunk of one or more probe data points based, at least in part, on the first input chunk of probe data points and the second input chunk of probe data points, where the output chunk of one or more probe data points includes at least one probe data point from each of the first input chunk of probe data points and the second input chunk of probe data points.

BRIEF DESCRIPTION OF THE DRAWINGS

Figure 1:
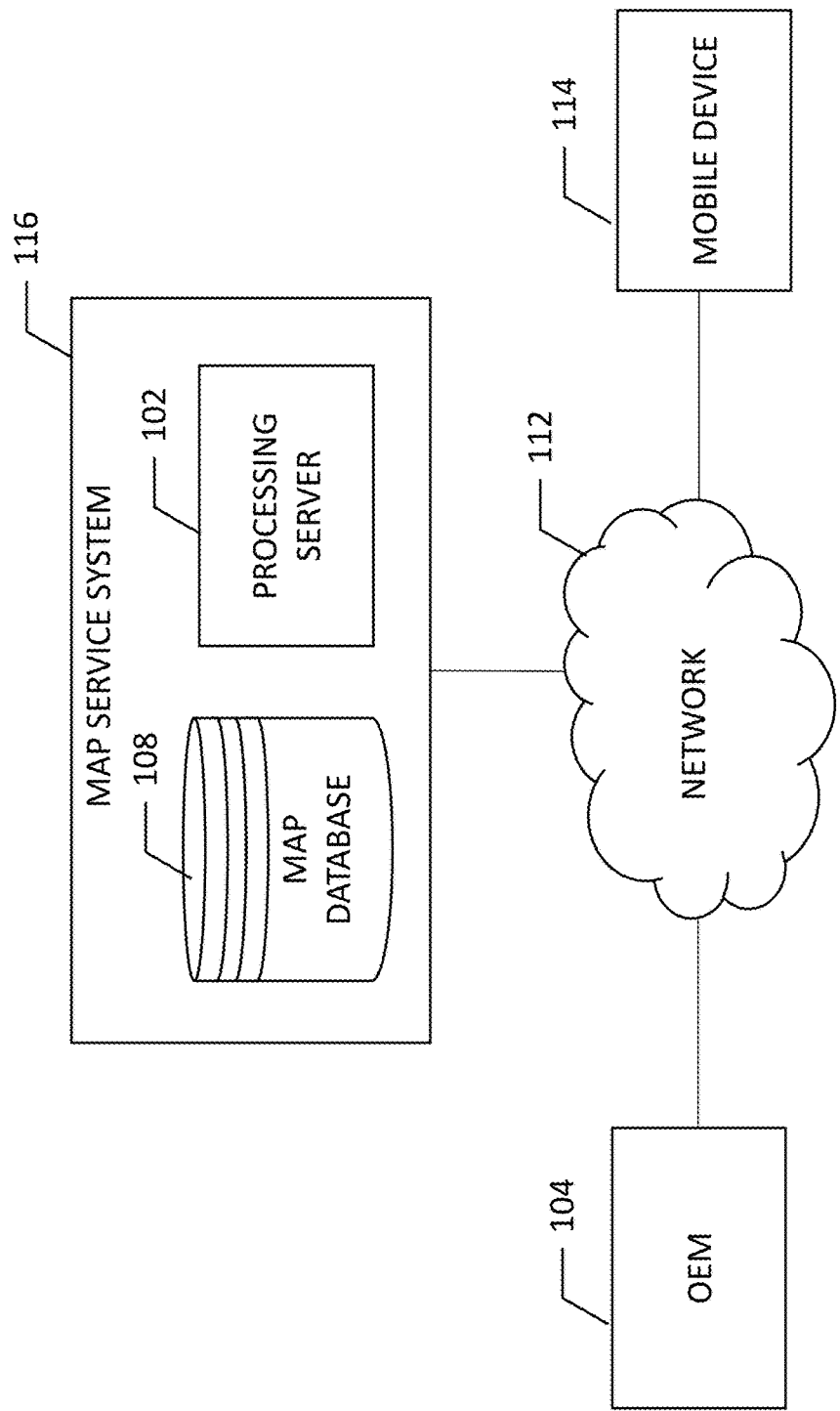
Figure 2:
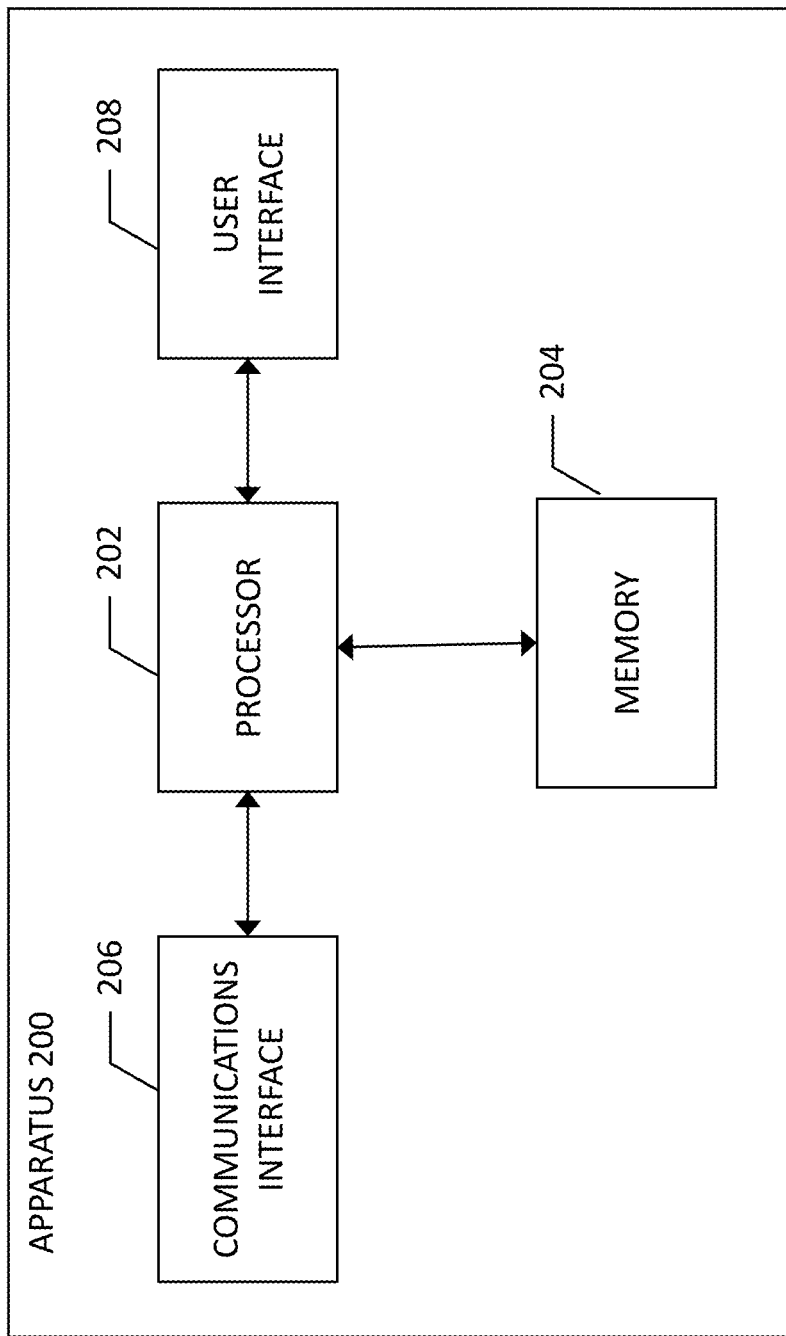
Figure 3:
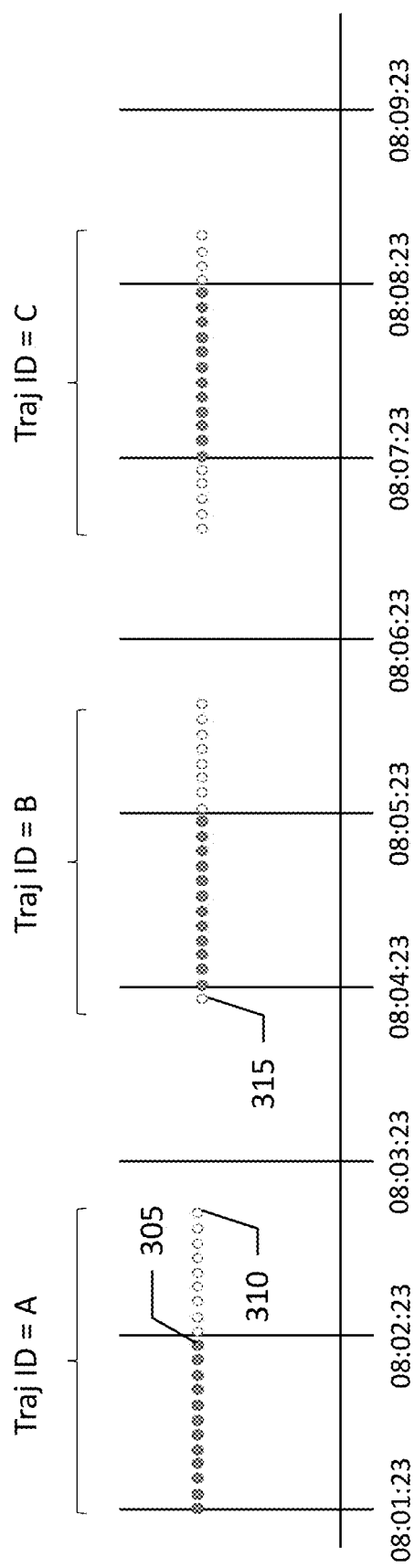
Figure 4:
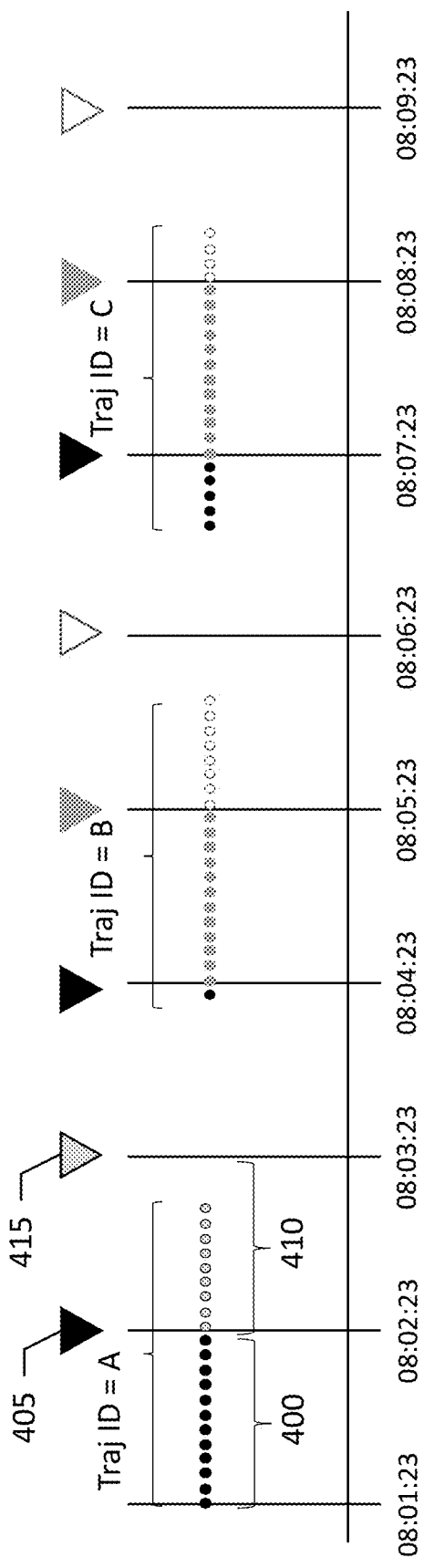
Figure 5:
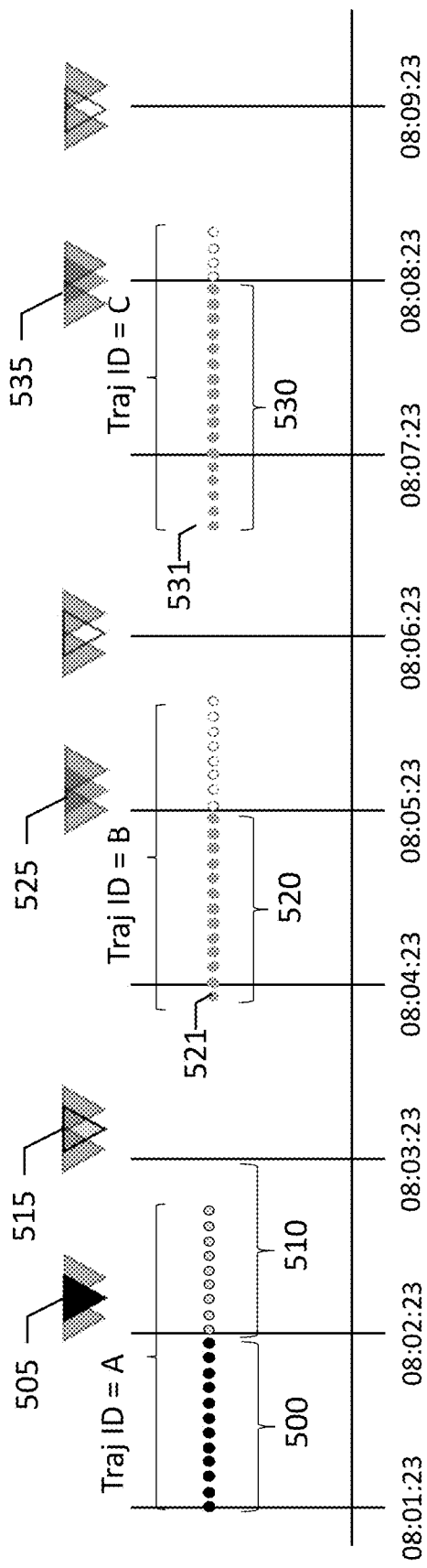
Figure 6:
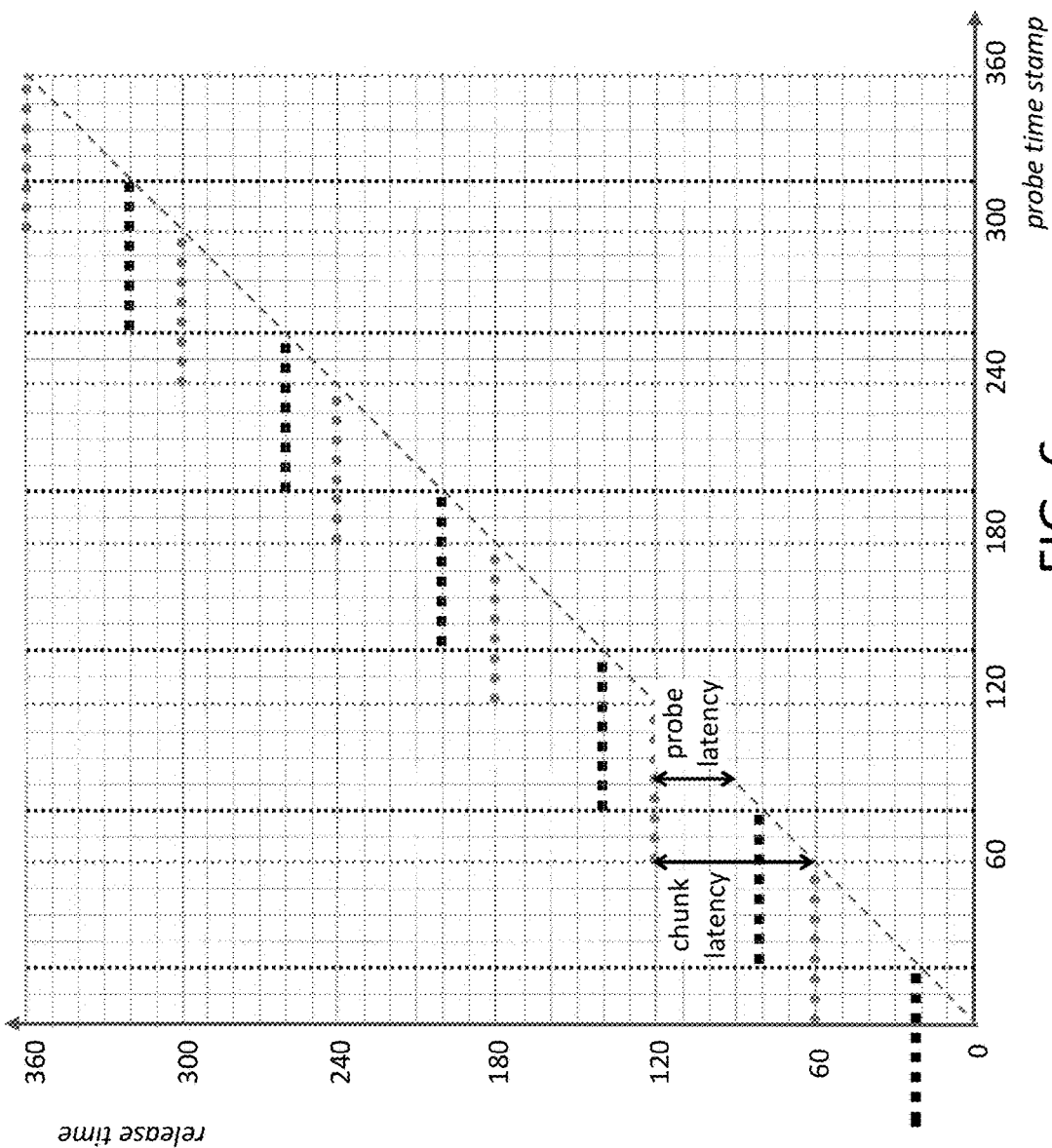
Figure 7:
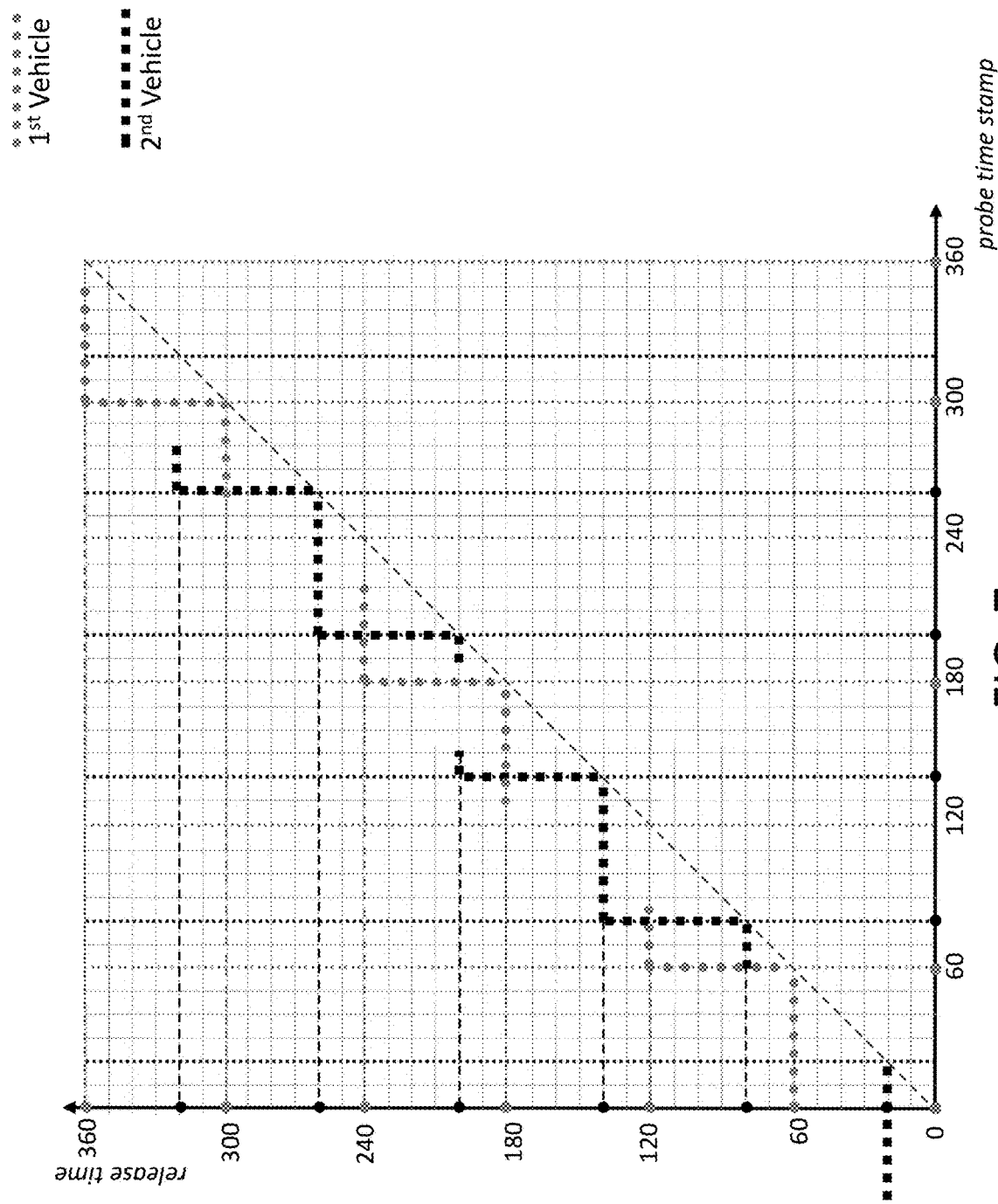
Figure 8:
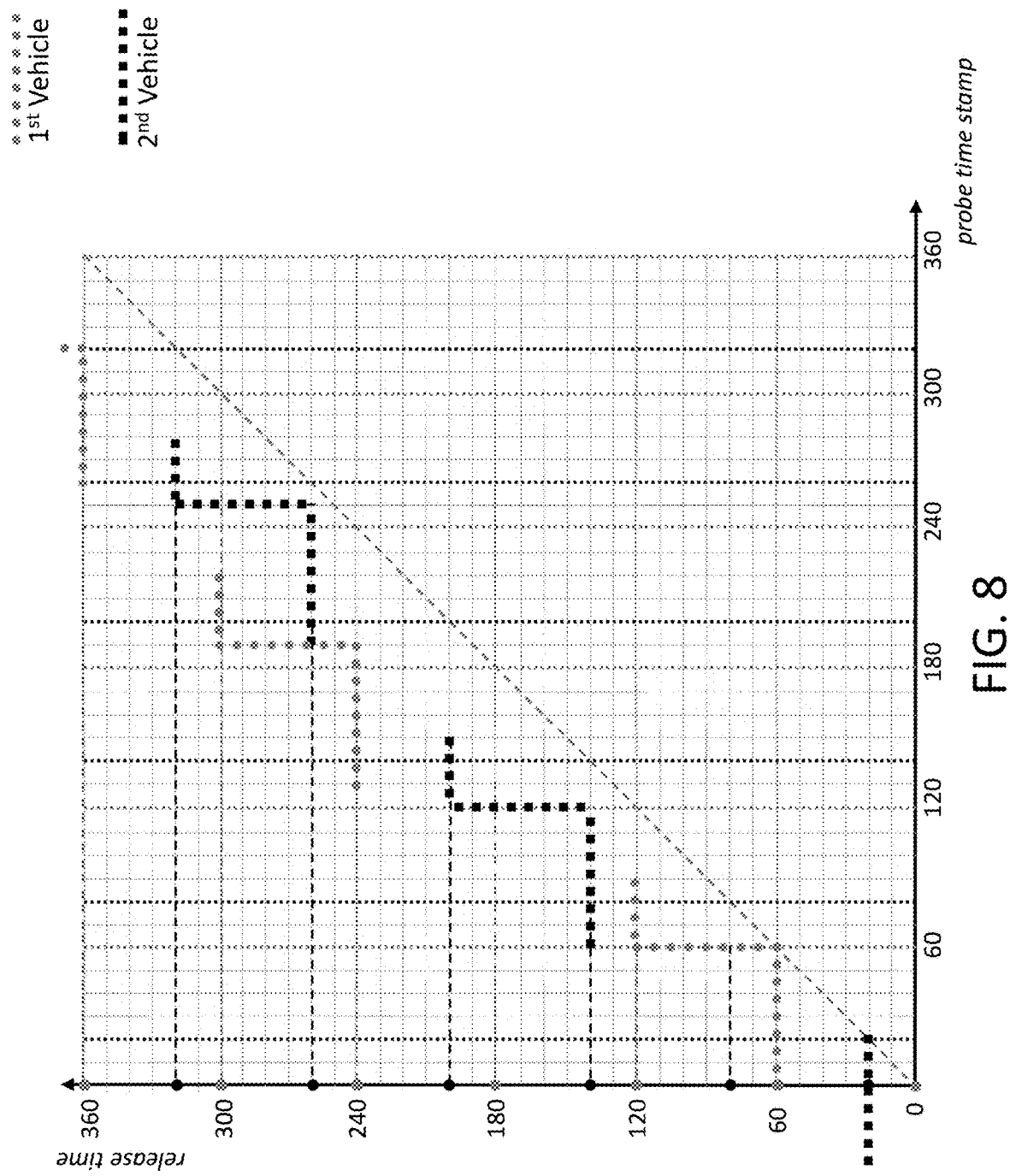
Figure 9:
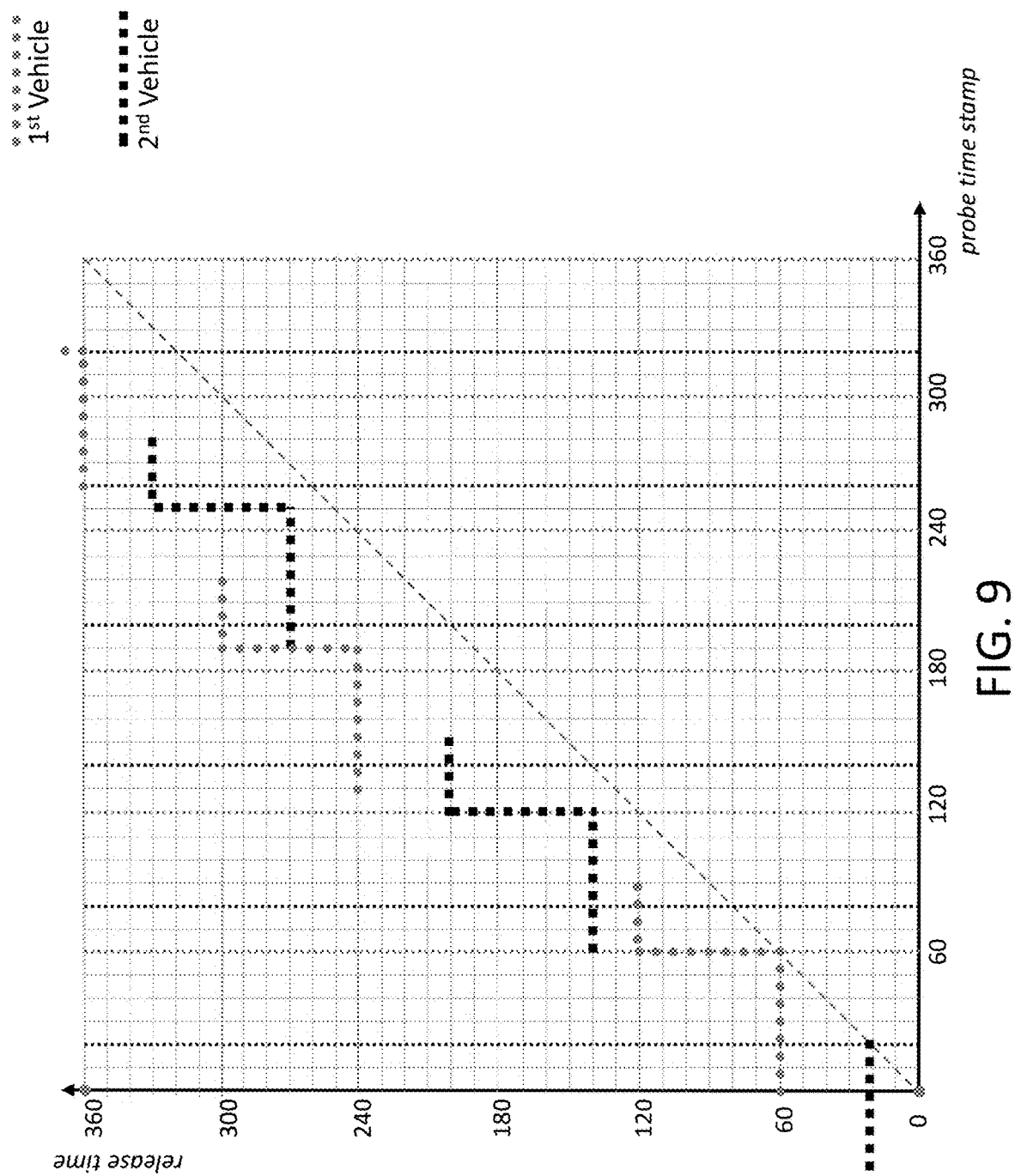
Figure 10:
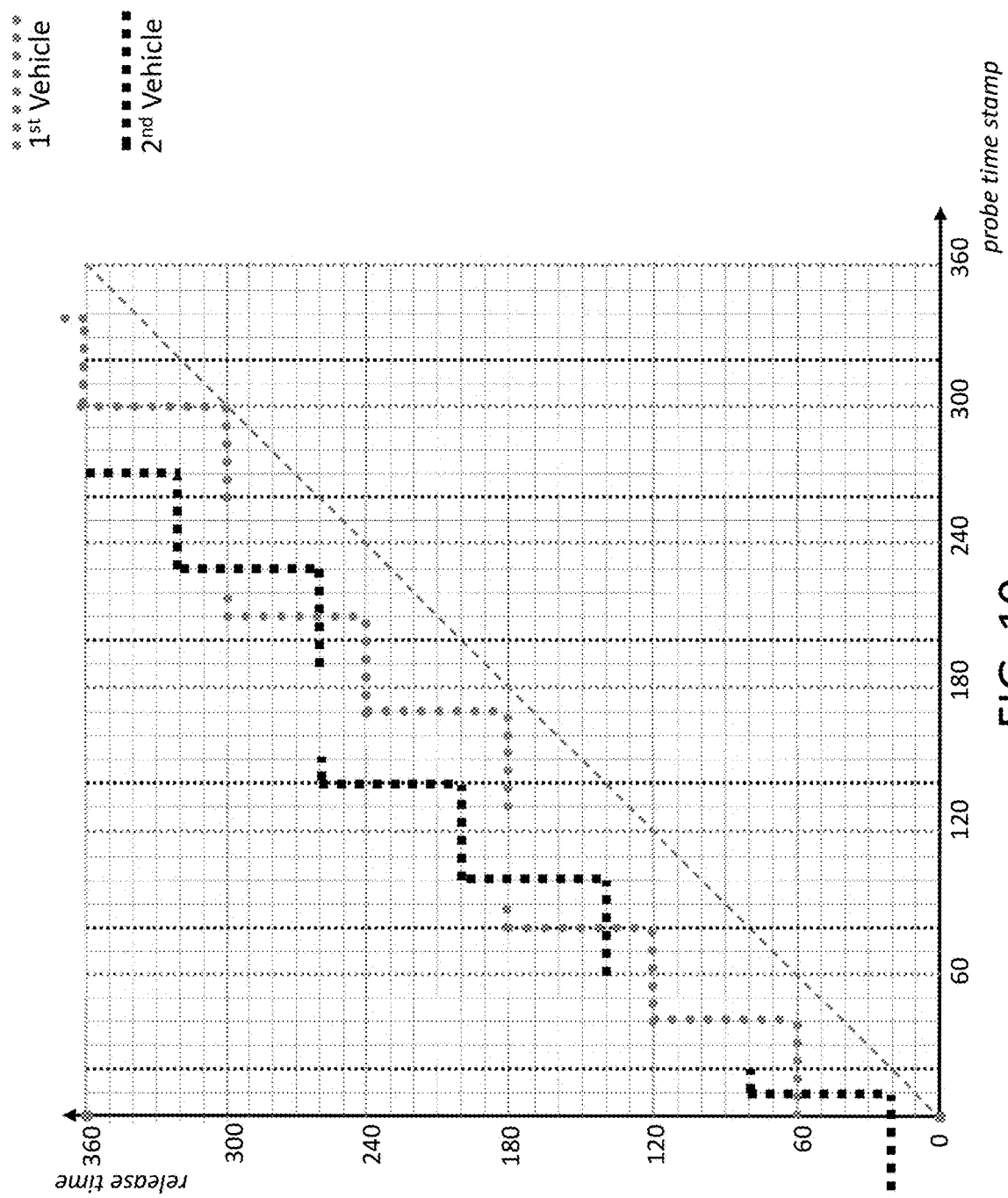
Figure 11:
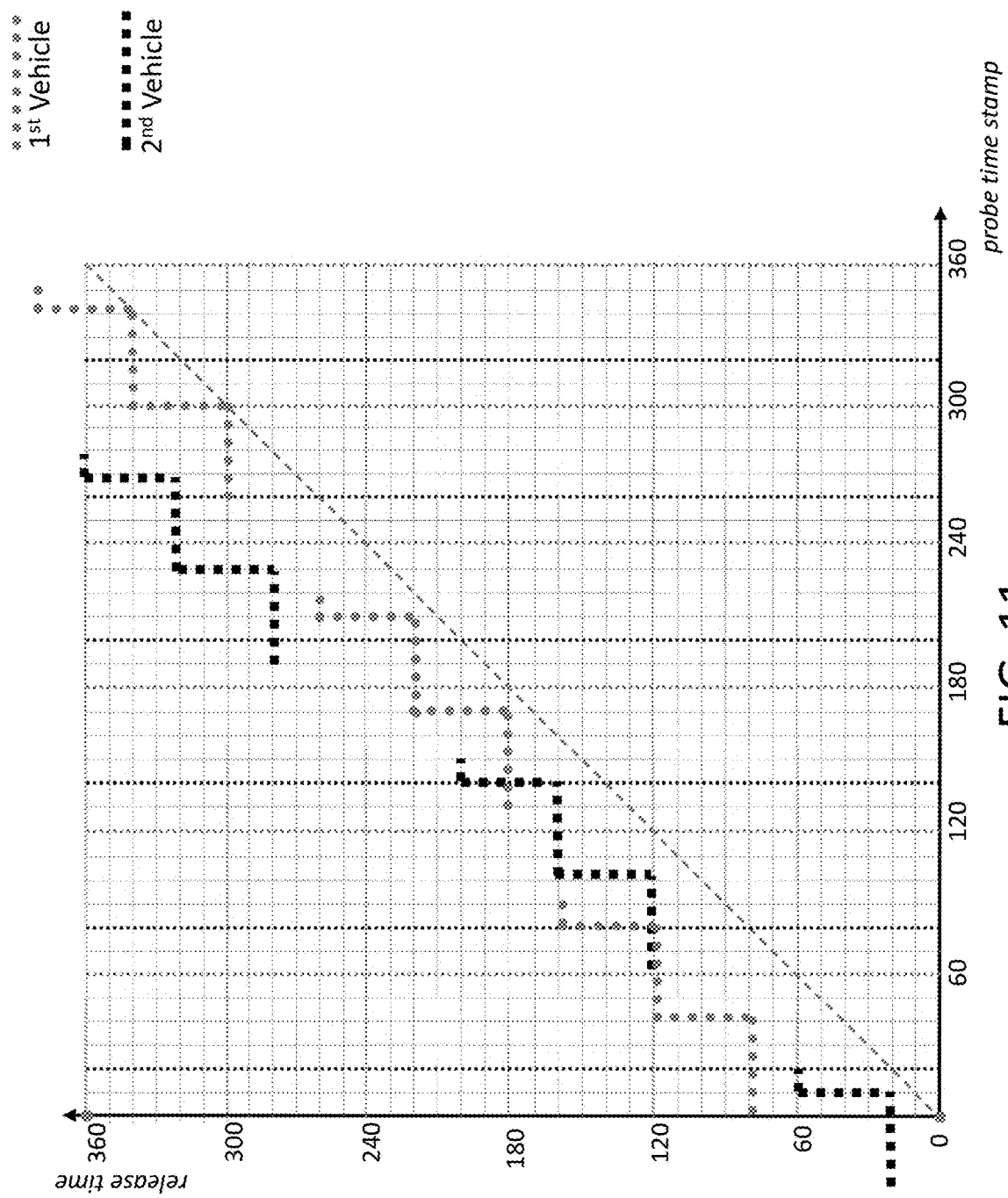
Figure 12:
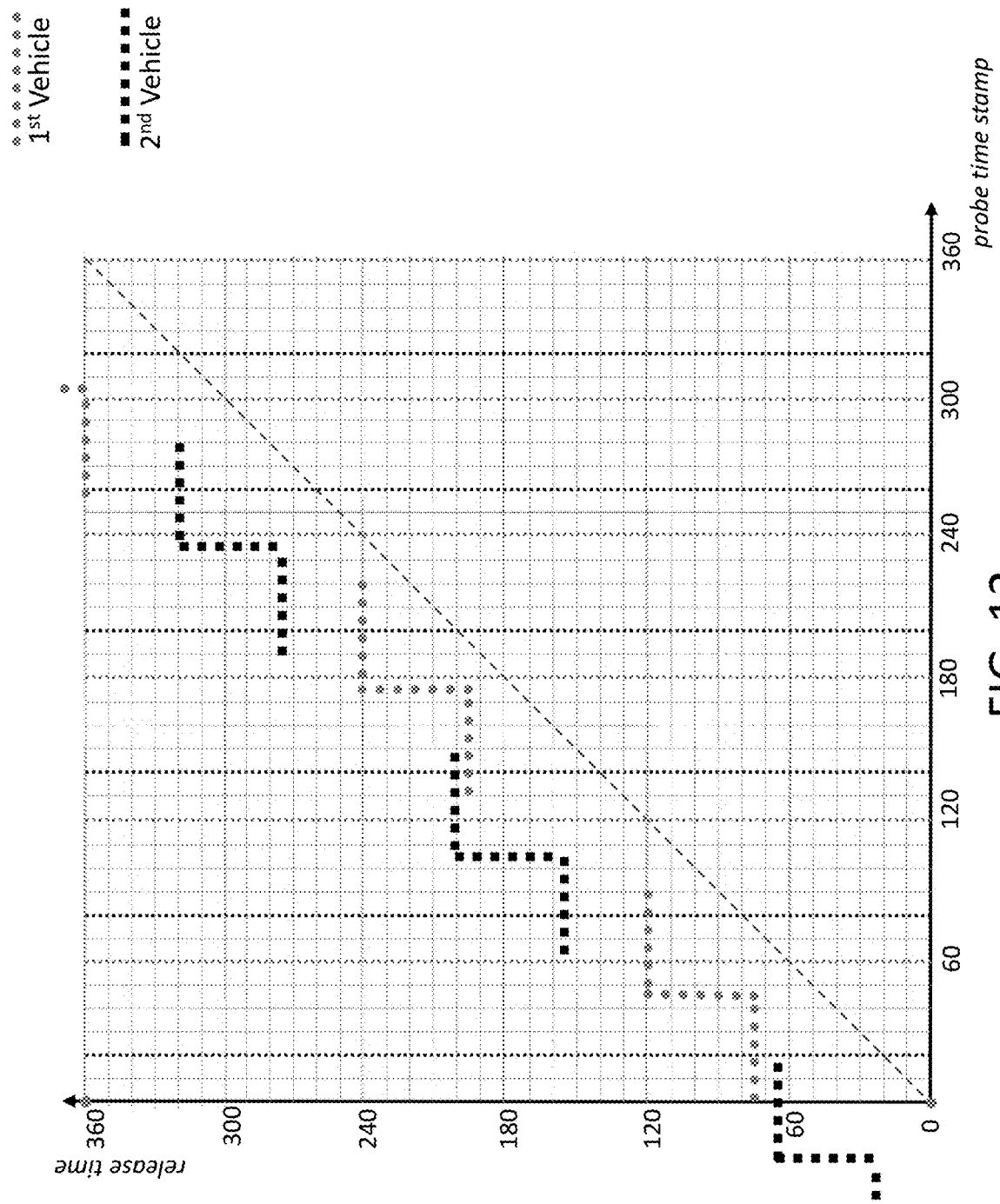
Figure 13:
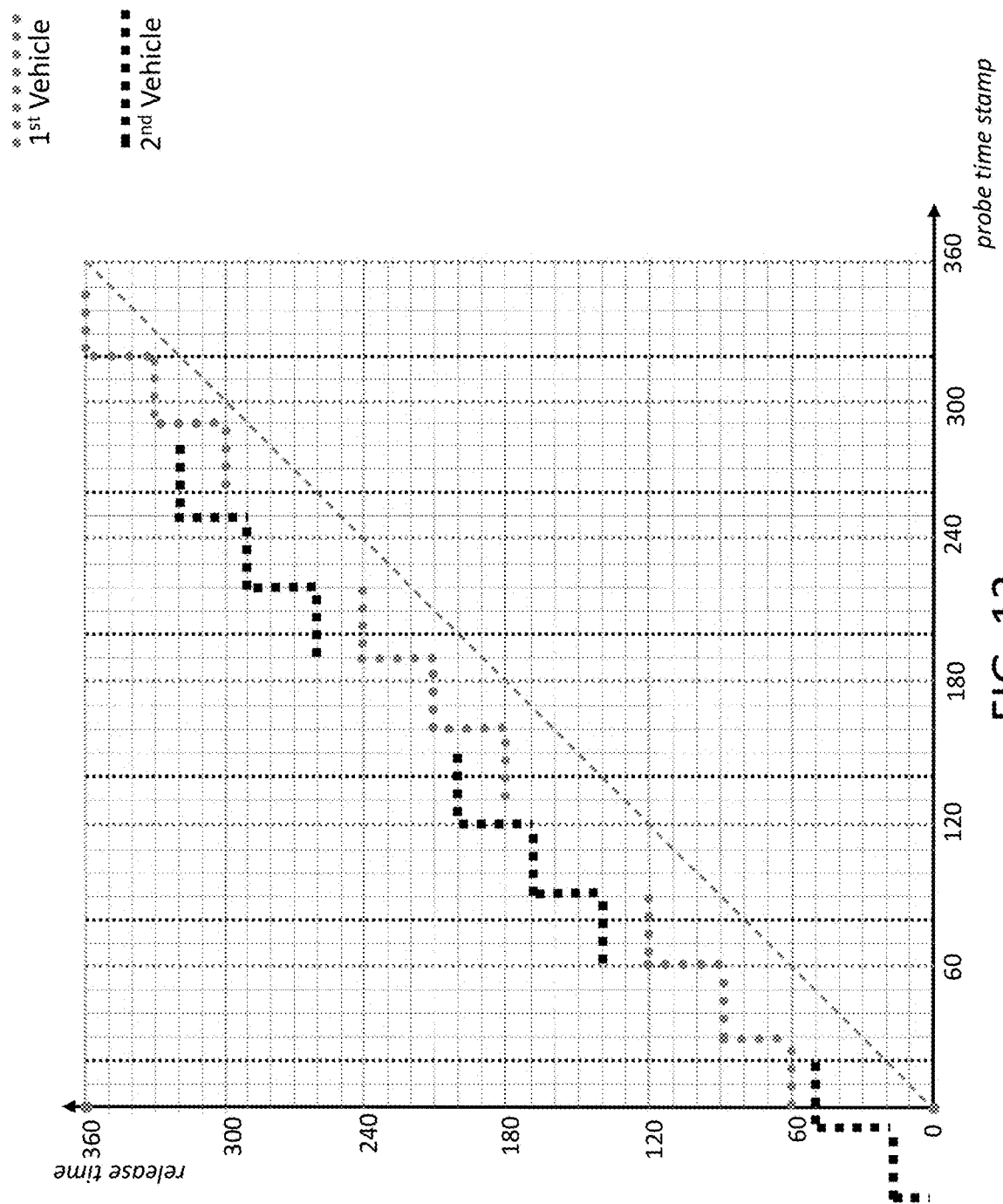
Figure 14:
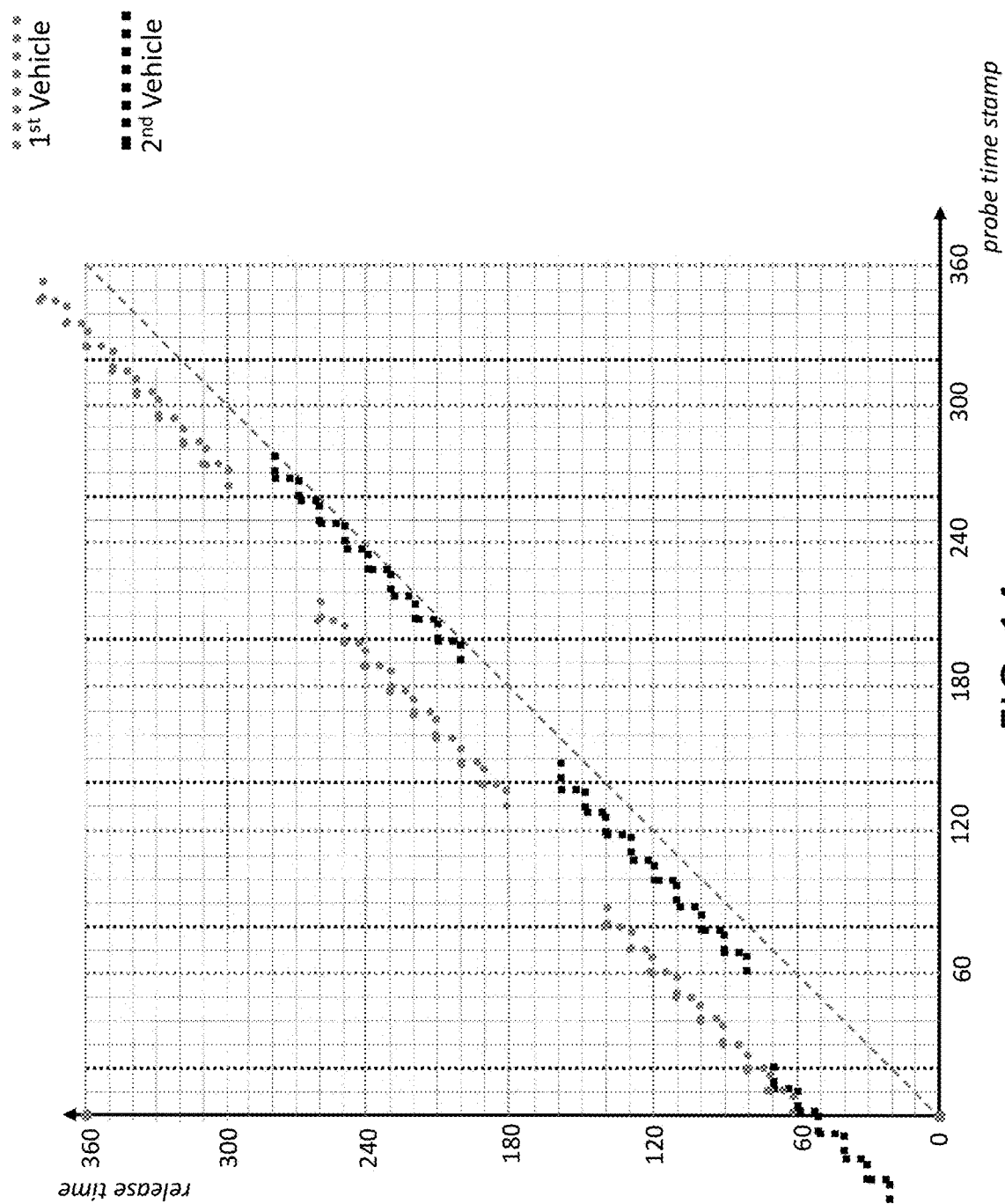
Figure 15:
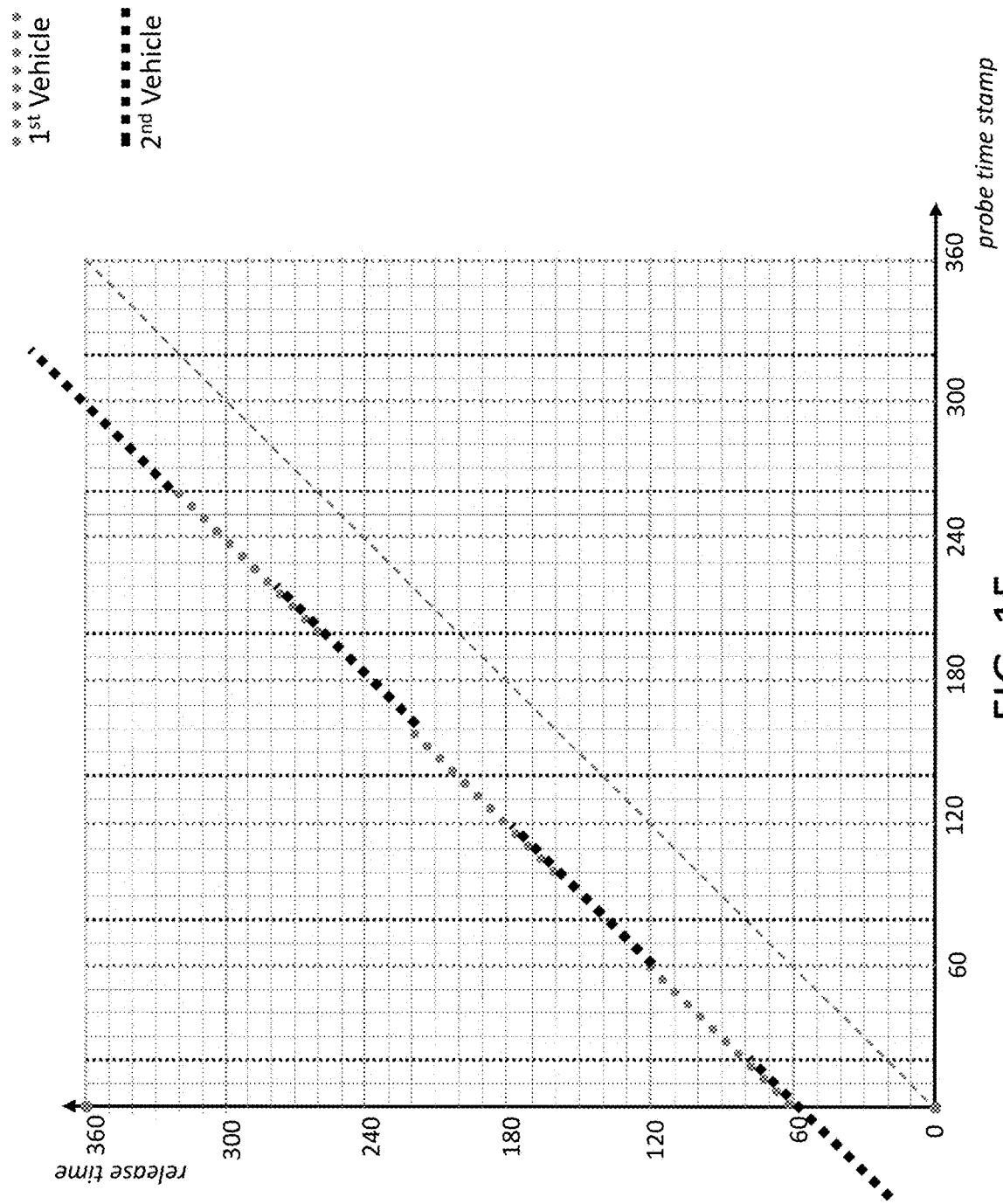
Figure 16:
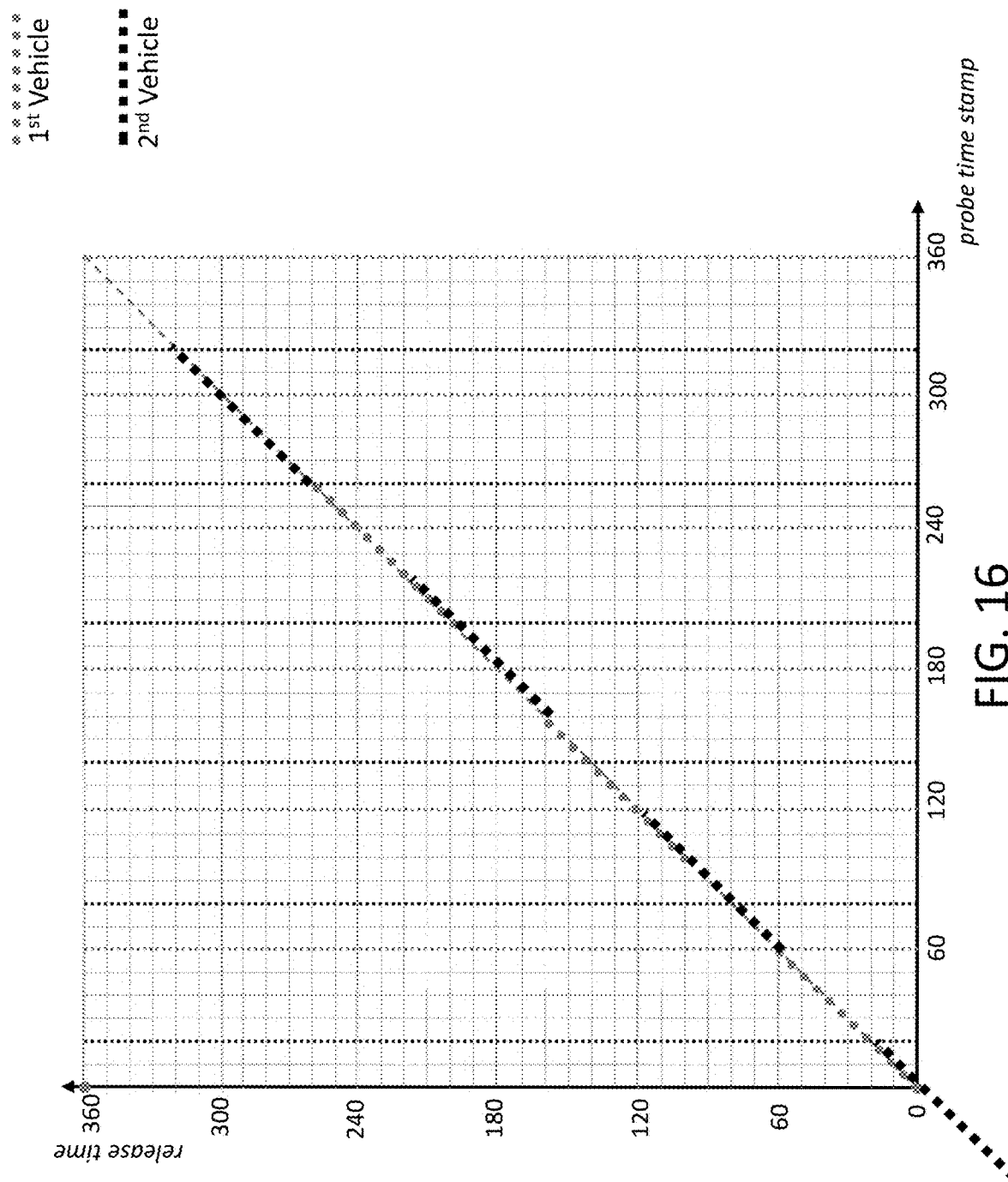
Figure 17:
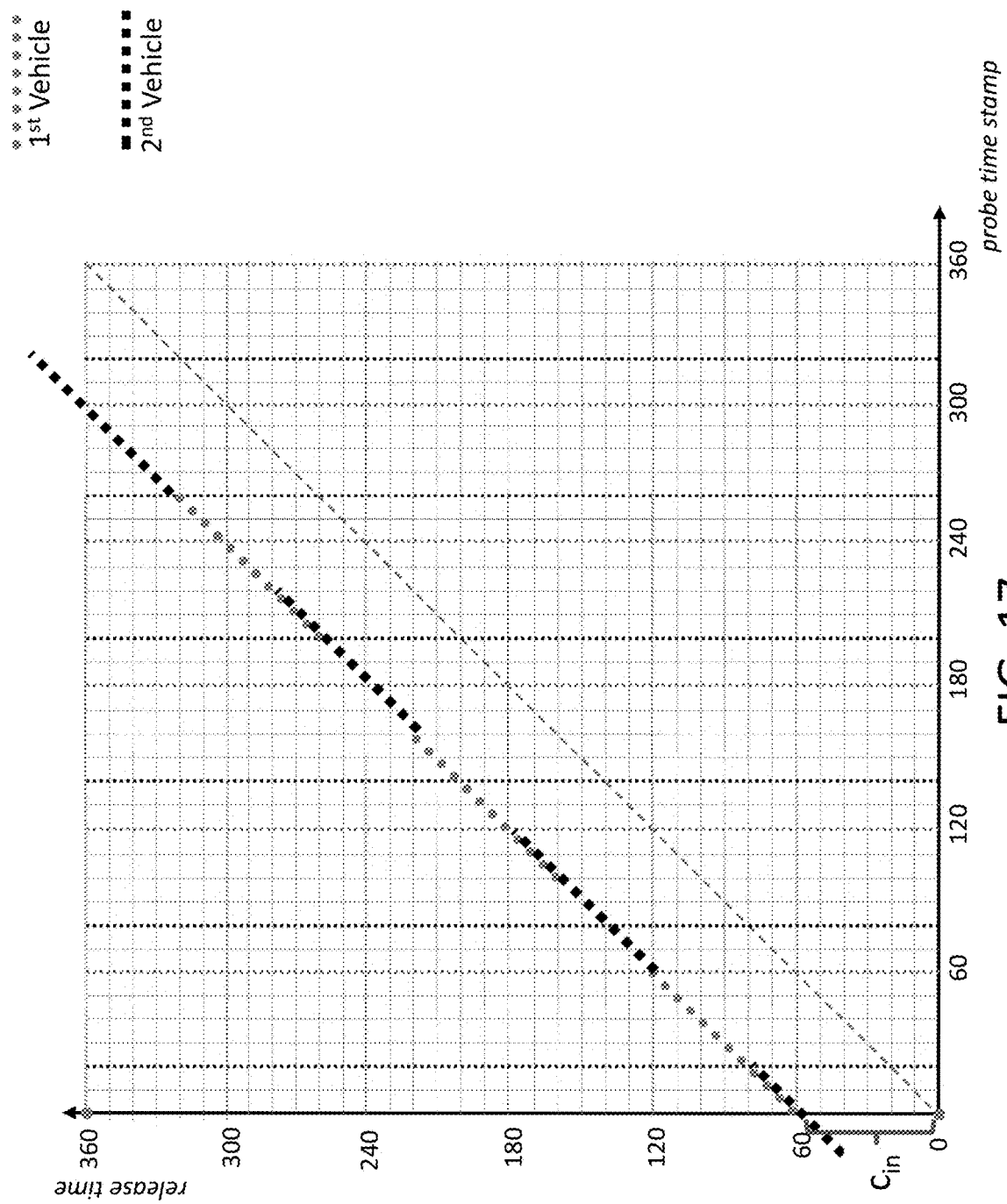
Figure 18:
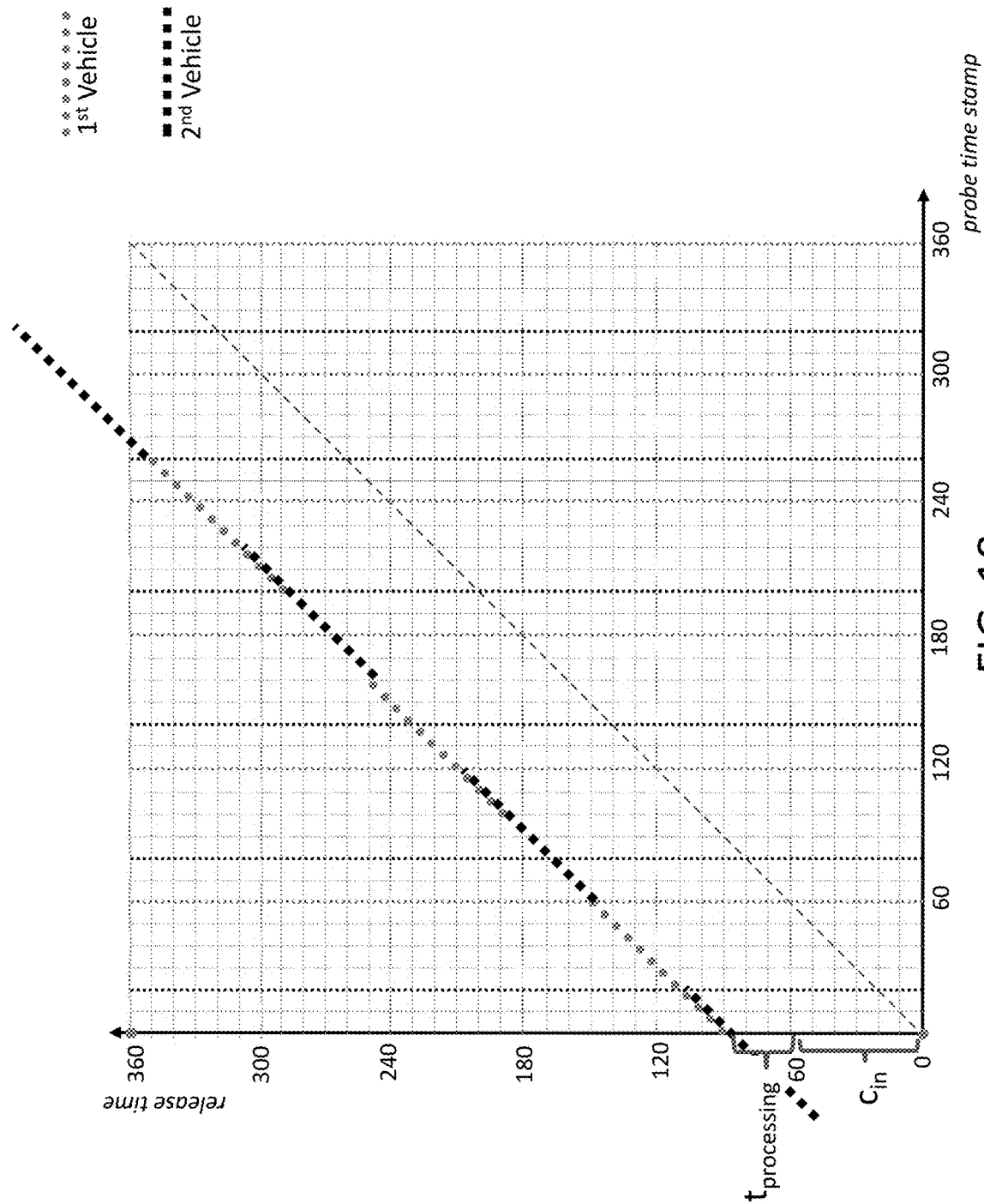
Figure 19:
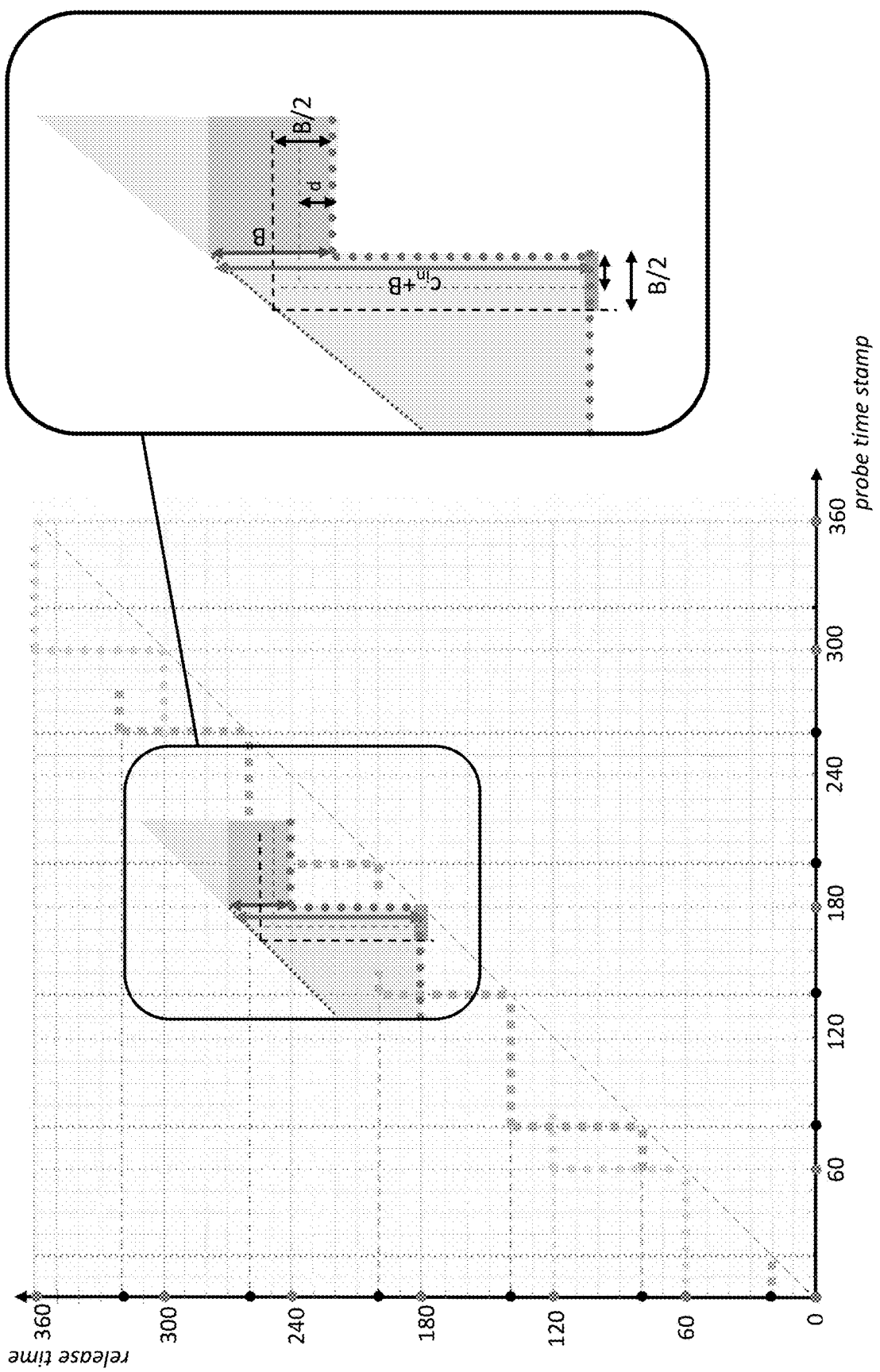
Figure 20:
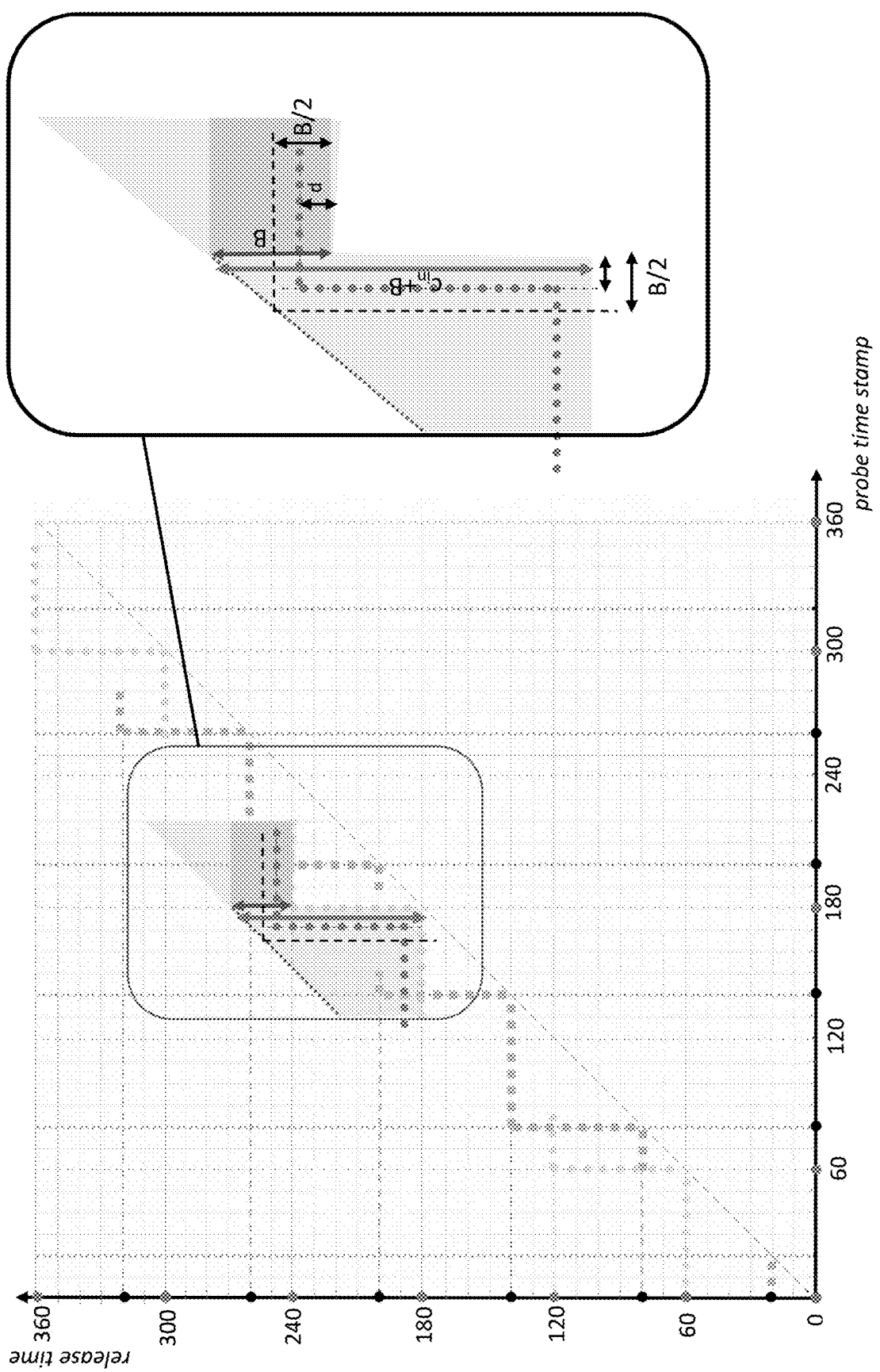
Figure 21:
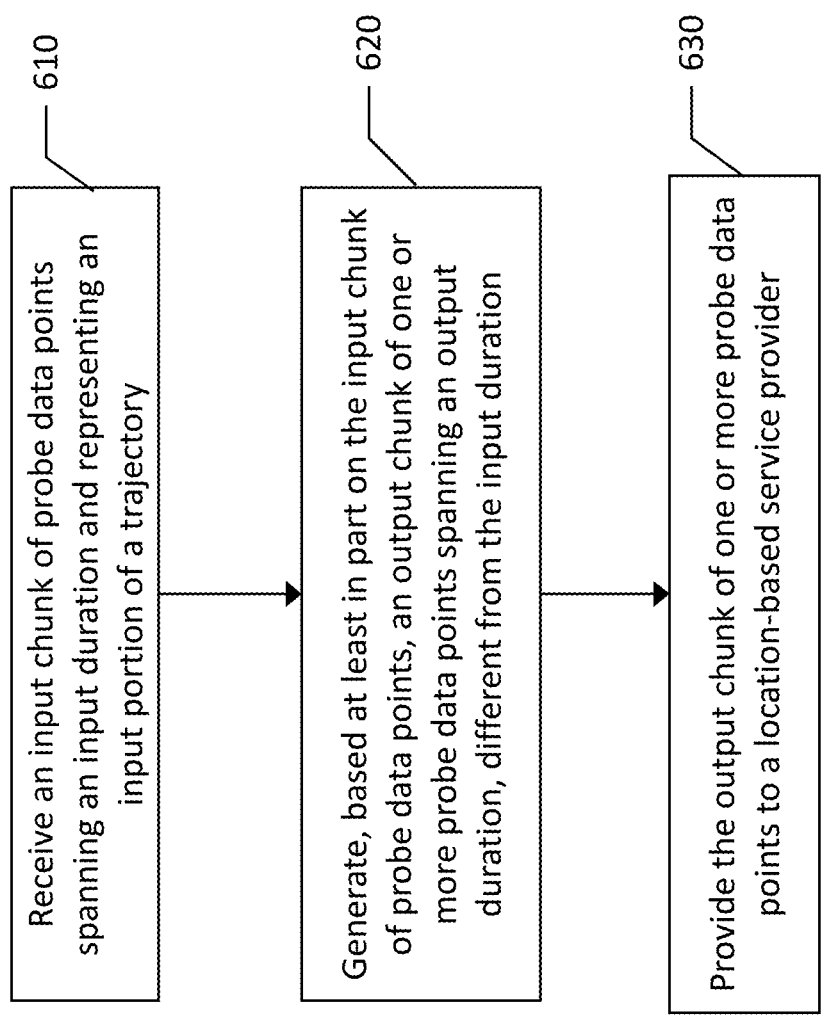

Having thus described example embodiments of the disclosure in general terms, reference will now be made to the accompanying drawings, which are not necessarily drawn to scale, and wherein:

FIG. 1 illustrates a communications diagram in accordance with an example embodiment of the present disclosure;

FIG. 2 is a block diagram of an apparatus that may be specifically configured for anonymizing trajectories generated from probe data in accordance with an example embodiment of the present disclosure;

FIG. 3 is a timeline of the splitting and gapping of a trajectory together with the chunking of the data according to an example embodiment of the present disclosure;

FIG. 4 is a timeline of chunking and transmitting portions of a trajectory according to an example embodiment of the present disclosure;

FIG. 5 is a timeline of re-chunking, adding random delay, and transmitting portions of a trajectory according to an example embodiment of the present disclosure;

FIG. 6 illustrates chunked trajectory data without anonymization according to an example embodiment of the present disclosure;

FIG. 7 illustrates chunked trajectory data anonymized into sub-trajectories and gaps according to an example embodiment of the present disclosure;

FIG. 8 illustrates re-chunked trajectory data for further anonymization according to an example embodiment of the present disclosure;

FIG. 9 illustrates re-chunked and randomly delayed trajectory data for further anonymization according to an example embodiment of the present disclosure;

FIG. 10 illustrates re-chunked and randomly delayed trajectory data with a first set of parameters according to an example embodiment of the present disclosure;

FIG. 11 illustrates re-chunked and randomly delayed trajectory data with a second set of parameters according to an example embodiment of the present disclosure;

FIG. 12 illustrates re-chunked and randomly delayed trajectory data with a third set of parameters according to an example embodiment of the present disclosure;

FIG. 13 illustrates re-chunked and randomly delayed trajectory data with a fourth set of parameters according to an example embodiment of the present disclosure;

FIG. 14 illustrates re-chunked and randomly delayed trajectory data with a fifth set of parameters according to an example embodiment of the present disclosure;

FIG. 15 illustrates re-chunked and randomly delayed trajectory data with a sixth set of parameters according to an example embodiment of the present disclosure;

FIG. 16 illustrates real-time output of individual probe data points according to an example embodiment of the present disclosure;

FIG. 17 illustrates individual probe data points output with a delay introduced according to an example embodiment of the present disclosure;

FIG. 18 illustrates individual probe data points output with a delay and a processing delay according to an example embodiment of the present disclosure;

FIG. 19 illustrates an example embodiment of budget-tailored re-chunking of probe data points according to an example embodiment of the present disclosure;

FIG. 20 illustrates the example embodiment of budget-tailored re-chunking of probe data points of FIG. 19 after a delay is introduced according to an example embodiment of the present disclosure; and FIG. 21 is a flowchart of a method for anonymizing probe data points of a trajectory according to an example embodiment of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

Mobility data may be defined as a set of points or probe data points, each of which includes a location, such as a latitude and longitude, and a timestamp. Additional information may be associated with the probe data points, such as speed, heading, or other data. A trajectory includes a set of probe data points, where probe data points of a trajectory may include a trajectory identifier that associates the probe data points with one another. Mobility data captured in trajectories can be partitioned in a set of trajectories (trajectory data), each of which identifies the movement of a user over time A single trajectory might 'observe' events as it passes through a specific location in the road network and record data about the event. Some observations may have a higher utility than others, and the location-based service provider may seek to maximize the utility of anonymized data.

An additional constraint is that anonymization must be performed in almost-real-time (e.g., anonymized data must be released with a short delay). For this to happen, anonymization algorithms must decide which data points to drop and which ones to keep within a given maximum delay. Anonymizing of location and trajectory data may be performed through application of privacy-enhancing algorithms on the data. Such algorithms may include splitting and gapping of trajectories to subdivide trajectories into a number of shorter sub-trajectories that are pseudonymized and separated by gaps, where data from the original trajectory is dropped. Anonymization may include the placement of these gaps. Selection of these gaps in real-time or near-real-time is challenging. The selection of the gap must be performed as soon as the data point is available for real-time anonymization which means processing each probe data point individually. If the delay is larger (e.g., one-minute or 'near-real-time'), the anonymization can be performed on chunks of data of one-minute lengths, for example. In this case, the anonymized version of the data in a chunk is released as soon as the chunk ends (e.g., every one minute). Anonymization splits the input data into a number of sub-trajectories associated with different trajectory identifiers (trajectory IDs) and some gaps are left between the sub-trajectories, such that it is not obvious for an adversary to reconstruct a complete trajectory from the sub-trajectories. The sub-trajectories and gaps can be anonymization parameters that can be set and tuned according to the needs of a specific use case.

A method, apparatus, and computer program product are provided herein in accordance with an example embodiment for anonymizing trajectories of mobile devices, and more particularly, to enhancing the anonymization of trajectories that are segmented and gapped by introducing additional anonymizing factors that render it difficult to determine a source of the trajectory. Location-based services are useful to a variety of consumers who may employ location-based services for a wide range of activities. Services such as the identification of traffic location and density, providing information regarding goods and services available in a specific location, and identifying a target group of consumers in a particular location or who travel along a particular path, are among many other location-based services.

While location-based services are desirable for both consumers and for service providers, consumers are often concerned with the amount of information shared about their routines and activities. Thus, while consumers and service providers want to engage with location-based services, consumers generally desire to maintain some degree of privacy. Embodiments described herein provide a method, apparatus, and computer program product through which location information and more specifically, trajectory information can be gathered and shared in a manner that anonymizes the source of the information and makes unmasking of the source difficult. Embodiments provided herein segment and gap a trajectory using an algorithm and employ additional anonymization processes that alter the segments (e.g., providing different beginning and ending times) and introduce a randomized response delay to avoid source identification based on uniform segmenting and gapping.

Embodiments can anonymize both off-line (e.g., working with full trajectories) and on-line (e.g., working with trajectory chunks). The on-line variant reads the trajectory data in near real-time input chunks and anonymizes the trajectory in output chunks of a given length (e.g., 1 minute). This means that the delay of any probe point, from its reception to the decision of whether to disclose it or not, will always be at most the chunk size (plus any delay due to processing and transmission). Embodiments render it difficult to establish to whom the trajectory belongs while obtaining useful location-based trajectory information for use with location-based services. The additional features of re-segmenting or re-chunking of trajectories and introducing a randomized response delay further obfuscate the source of the trajectory data and render the source of the trajectory more difficult to ascertain by adversaries.

To provide an improved manner of anonymizing trajectories, a system as illustrated in FIG. 1 may be used. FIG. 1 illustrates a communication diagram of an example embodiment of a system for implementing example embodiments described herein. The illustrated embodiment of FIG. 1 includes a map service system 116, a processing server 102 in data communication with an original equipment manufacturer (OEM) 104 and/or a geographic map database, e.g., map database 108 through a network 112, and one or more mobile devices 114. The OEM may be one form of a trajectory source from which a trajectory of a probe or mobile device is received. The trajectory source may optionally include third party service providers or app developers, for example. The mobile device 114 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 114 may connect with the network 112. The map service 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The OEM 104 may include a server and a database configured to receive probe data from vehicles or devices corresponding to the OEM. For example, if the OEM is a brand of automobile, each of that manufacturer's automobiles (e.g., mobile device 114) may provide probe data to the OEM 104 for processing. That probe data may be encrypted with a proprietary encryption or encryption that is unique to the OEM. The OEM may be the manufacturer or service provider for a brand of vehicle or a device. For example, a mobile device carried by a user (e.g., driver or occupant) of a vehicle may be of a particular brand or service (e.g., mobile provider), where the OEM may correspond to the particular brand or service. The OEM may optionally include a service provider to which a subscriber subscribes, where the mobile device 114 may be such a subscriber. While depicted as an OEM 104 in FIG. 1, other entities may function in the same manner described herein with respect to the OEM. For example, independent location-based service providers or other entities may participate and contribute in the same manner as described herein with respect to an OEM. As such, the OEM 104 illustrated in FIG. 1 is not limited to original equipment manufacturers, but may be any entity participating as described herein with respect to the OEMs.

The OEM 104 may be configured to access the map database 108 via the processing server 102 through, for example, a mapping application, such that the mobile device may provide navigational assistance to a user among other services provided through access to the map service 116. According to some embodiments, the map service 116 may function as the OEM, such as when the map service is a service provider to OEMs to provide map services to vehicles from that OEM. In such an embodiment, the map service 116 may or may not be the recipient of vehicle probe data from the vehicles of that manufacturer. Similarly, the map service 116 may provide services to mobile devices, such as a map services provider that may be implemented on a mobile device, such as in a mapping application. According to such an embodiment, the map service 116 may function as the OEM as the map service receives the probe data from the mobile devices of users as they travel along a road network.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map service. By way of example, the map service can collect geographic data to generate and enhance the map database 108. There can be different ways used by the map service to collect data. These ways can include obtaining data from other sources, such as municipalities or respective geographic authorities. In addition, the map service can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to vehicular travel, example embodiments may be implemented for bicycle travel along bike, watercraft travel along maritime navigational routes, etc. The compilation to produce the end user databases can be performed by a party or entity separate from the map service. For example, a customer of the map service, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 114 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

The processing server 102 may receive probe data, directly or indirectly, from a mobile device 114, such as when the map service is functioning as the OEM 104. Optionally, the map service 116 may receive probe data indirectly from the mobile device 114, such as when the mobile device 114 provides probe data to the OEM 104, and the OEM provides certain elements of the probe data to the map service 116. The OEM 104 may anonymize the probe data or otherwise process the probe data to maintain privacy of a user of the mobile device 114 before providing the data to the map service 116. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102, either directly or indirectly, may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) may be representative of the location of a vehicle at a respective point in time and may be collected while a vehicle is traveling along a route. According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 and/or an OEM 104 may be embodied in an apparatus as illustrated in FIG. 2. The apparatus, such as that shown in FIG. 2, may be specifically configured in accordance with an example embodiment of the present disclosure for anonymizing trajectories of mobile devices, and more particularly, to segmenting a trajectory and introducing gaps between the trajectory segments or sub-trajectories based on tailored use cases to retain portions of the trajectory that have higher utility. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Location-based services (LBS) such as real-time traffic information, fleet management, and navigation among others, are based on the analysis of mobility data that users of such services provide. Mobility data is associated with a privacy level and accuracy value. An accuracy value is based on the intrinsic utility of data toward the generation of location-based services. The privacy value reflects the sensitive information that mobility data reveals about a user's habits, behaviors, and personal information such as their home and/or work address.

Location-based service providers endeavor to collect as much location data as possible to maximize the accuracy of the location-based services, while attempting to minimize the associated risks for the privacy of the users particularly as it relates to the inadvertent disclosure or misuse of data. To reduce the privacy risk, location-based service providers may apply privacy-enhancing algorithms on data. Privacy-enhancing algorithms function by removing or altering features of the data that may remove privacy, and this operation typically renders the data less accurate and thus less valuable for the location-based service provider.

Embodiments described herein provide privacy to users of location-based services by adding uncertainty regarding the trajectory from origin to destination of the user. An origin, destination, separately or as a pair, and even portions of a trajectory not including the origin or destination, can reveal sensitive locations regarding the user that generated the trajectory data, such as a home location and/or a work location, a path there between, route preferences, tendencies, or the like. Further, identification of an origin, a destination, or both, may render the identity of the individual user relatively easy to obtain.

Trajectory data as described herein is defined as a set of data points, each data point including a location and a timestamp. The location may be in the form of latitude and longitude, and potentially altitude. Additional information may be associated with a data point, such as speed, heading, etc. If a trajectory identifier is associated with each point, the trajectory data can be partitioned into a set of trajectories, each of which identifies the movement of a user over a period of time.

Location-based service providers may provide trajectory data to customers, such as municipalities interested in traffic optimization, data producers (e.g., drivers who share their trajectory data with the service provider), or the like. Any trajectory that reveals a user's behavioral patterns (e.g., going from A to B) can potentially reveal privacy-sensitive information and locations. Embodiments described herein improve upon segmenting and gapping anonymization algorithms by re-segmenting or re-chunking of the trajectory data to form new data chunks that can be the same or can be changed from the original data chunks, and introducing a randomized response delay to obfuscate any link to the original chunking.

Mobile devices including those carried by users, those associated with vehicles, and any other device type that will track location, produce, and transmit sensor data that reflects what was observed during a trip. Sensor data may be transmitted as a sequence of probe points, where the probe points contain sensor observations related to a specific location in space and time. These mobile devices may also observe events (e.g., semantic objects with information about a specific condition such as rain, presence of a road sign, and vehicle malfunction) during a trip. For events to be used in location-based service solutions, the events need to be matched (approximately, within a time window and/or spatial tolerance) to a specific probe data point.

According to an example embodiment described herein, a fleet of vehicles may transmit their trajectory (e.g., through use of a mobile device 114 carried by or incorporated into the vehicle) in real time, where a probe data point is transmitted as it is measured/collected to an OEM 104. The OEM 104 may anonymize the trajectory data prior to release to a service provider. This anonymization may be due to regulatory requirements, agreed-upon terms of use, or user-preferences, for example.

An example embodiment of anonymization of a trajectory can include gathering probe data points over a period of time, where that period of time is defined as "chunk size" seconds. This chunk size parameter is a measure of time defining the duration over which data is collected before transmitting the "chunk" as a batch to a data provider, such as map service 116 of FIG. 1. The data provider can then anonymize the received data and provide the anonymized data to a service provider, such as a traffic data service provider or other provider that benefits from location and trajectory data.

Each service provider has some allowed latency time in the trajectory data they receive. For example, trajectory data that is an hour old may be useful for sign recognition, map building/healing, etc., but has no value for traffic services as traffic changes in a much more dynamic manner, such every minute or two. For a traffic service the latency has to be as low as possible (e.g., <=allowed latency). For a traffic service, the data provider must receive data in relatively short chunks (e.g., 60 seconds), anonymize the data, and provide the data in less time than the allowed latency.

Anonymization can be performed based on the following parameter relationships:

chunk_size+processing time<=allowed_latency sub-trajectory size<chunk_size gap_size<chunk_size Where the chunk size is the size of the data batch provided to the data provider measured in seconds. The allowed latency is a measure of the latency permitted by an end-user of the trajectory data, such as a traffic service provider, measured in seconds. The processing time is the amount of time needed by the data provider to receive and anonymize the trajectory data before providing it to a service provider. The sub-trajectory size is the length of a sub-trajectory including probe data points that is provided to the data provider measured in seconds. The gap size parameter is the size of the gap that is introduced between sub-trajectories in the data, measured in seconds. Using the above parameters, embodiments provide anonymization for use cases with large allowed latency values and large chunk size. However, in cases with short allowed latency, such as in the case of traffic services, these parameter requirements may not be beneficial. For example, where allowed latency is around one minute, with a chunk size of around one minute, the anonymization pipeline receives only one minute of data for processing, such that the sub-trajectory size and gap size can only be very small. A very small gap size, in many cases, does not provide sufficient privacy protection absent a very dense dataset where adversaries may have too many very short sub-trajectories within a small area.

Another way of performing anonymization can be performed based on the following parameter relationships:

chunk_size+processing time<=allowed_latency sub-trajectory size>chunk_size gap_size>chunk_size This method allows a data provider to achieve higher privacy while preserving the freshness of the data and therefore the utility of the data. According to this method, the state of the trajectory (whether it is at a "gap" or a "sub-trajectory") is identified at the end of a data chunk to allow sub-trajectories and gaps to be of longer duration than the chunk size. This allows a sub-trajectory and/or a gap to be longer than a batch of data sent to the data provider, enabling greater gap lengths for increased privacy. Embodiments provided herein improve upon this anonymization through additional processes that further thwart attempts by adversaries to identify the source of the trajectory data.

The above-described example is one option for the relationship between sub-trajectory size, chunk size, and gap size; however, embodiments provided herein can be implemented regardless of the relationship between these elements. For example, both sub-trajectory size and gap size can be smaller, larger, or the same size as an input or output chunk, or any combination thereof. Both the sub-trajectory size and gap size can be larger than a chunk (input or output), both smaller, one larger and the other smaller, etc. Thus, the relationships between chunk, gap, and sub-trajectory size in the aforementioned example is not intended to be limiting.

An example embodiment of the aforementioned process is described herein using an example trajectory that begins at time 08:01:23 (hours/minutes/seconds). The anonymization and use case parameters of this example include:

chunk_size=60 seconds
sampling rate=5 seconds
sub-trajectory size=100 seconds
gap_size=70 seconds
acceptable_latency=120 seconds FIG. 3 illustrates an example embodiment using the above-noted parameters. As shown, a vehicle or mobile device collects data for one minute (chunk length) and each minute of data is sent to the data provider that anonymizes the data according to the current state: if the sub-trajectory size has not yet been reached (e.g., the chunk ended during a sub-trajectory, at point 305 of FIG. 3), the current trajectory identifier (traj ID=A) is used and the data is being sent to the service provider without delay. If the current sub-trajectory has already reached allowed sub-trajectory size (as found between 08:02:23 and 08:03:23 at 310 of FIG. 3), the gap started and no data is sent further. When the gap ends anonymization changes the identifier for the next sub-trajectory, such as the trajectory "traj ID=B" begins at 315 in FIG. 3.

A malicious adversary may attempt to determine the source of a trajectory anonymized in the above-described manner by comparing the timestamps of the probes in the chunks to get an additional hint for attempted reconstruction. In the example of FIG. 3, all of the last probe data points of the full chunks have a timestamp ending at the $18^{th}$ second of the minute since the sampling rate is five seconds. The timestamps may be recorded by the adversary which may recognize that all messages from the data provider come after the $23^{rd}$ second of the minute plus processing time, which may help the adversary identify the source.

Embodiments describe herein rectify this potential area of weakness for an adversarial attack by re-chunking of the data during the anonymization process. The size of newly formed chunks can remain the same or can be changed, with probe data points in the newly formed chunks not revealing the initial chunking of the trajectory. Without this improvement, the first or last probe data point of the chunk may serve as a hint for an adversary. Embodiments may further provide a randomized response delay. Since the timing of messages that come from the anonymization mechanism are aligned with the initial chunking, the output from the anonymization pipeline may be delayed randomly to obfuscate the link to original chunking.

According to an example embodiment, a near real-time scenario may be used where a location-based service has a requirement relating to the freshness of data, where data may need to be processed within e.g. one or two minutes of its generation. A vehicle (e.g., mobile device 114) collects data for a period of chunk size seconds and sends it to the data provider, such as the map service 116 of FIG. 1. The data provider anonymizes the data promptly (e.g., immediately) and sends it to the location-based service provider that requires the data latency to be less than allowed latency seconds. Anonymization pipeline on the data provider's backend performs the re-chunking and randomized delay response according to the process described herein.

If a new sub-trajectory starts in the current at time t1, anonymization mechanism waits until it obtains a probe data point with the timestamp greater than t1+new_chunk_size, and after that the chunk of data with timestamps from t1 to t1+new_chunk_size. The new chunk size parameter is the size of the new chunk for re-chunking of the data to vary the chunk size in order to render it more difficult for an adversary to identify the source of the trajectory. Since message timing can also provide a hint to an adversary, an additional random response delay can be added before the data is sent to the location-based service provider. FIGS. 4 and 5 show the differences between splitting-and-gapping trajectories and splitting-and-gapping with re-chunking of the data and the randomized delay.

As shown in FIG. 4, a first chunk of data 400 is provided to the data provider at 405, while a second chunk of data 410 is provided to the data provider at 415. The data is evenly spaced by chunk length and transmitted without delay. This occurs perpetually in the embodiment of FIG. 4. As shown in FIG. 5, because of the length of the sub-trajectory, it cannot be composed of a whole number of chunks as some of the chunks are composed of gaps. The chunk length is shown by the bracket below the probe data points, such as with first chunk of data 500, where the transmission delay is represented by the different triangles representing transmission as shown at 505. The delay is random such that the triangles represent possible times of transmission of the associated chunk. The chunk length varies such as with chunk 520 that includes probe data point 521 that was previously found in a different chunk as shown in FIG. 4. The difference in chunk length is due to the relation between sub-trajectory length and the chosen chunk size, based on the splitting and gapping of the trajectory. The chunk of data 520 is transmitted at 525 with the random delay. Similarly, several probe data points 531 that were in a different chunk of data in FIG. 4 are included in chunk of data 530 that is transmitted with random delay at 535. This re-chunking method provides for an embodiment in which an output portion of the trajectory to the location-based service provider can include a portion of a first input portion of a trajectory and a second input portion of a trajectory from probe apparatus. Probe data point 521 was in a first input portion of the trajectory, while the probe data points immediately following probe data point 521 were of a second input portion of the trajectory. The chunk of data 520 became a re-chunked output portion of the trajectory including at least some, but not all of both input portions of the trajectory.

The aforementioned process of anonymization is further described herein. According to example embodiments described herein, $c_{in}$ is the size of the input-chunk of the data (the size of the data chunk sent by the data provider) and $f_{in}$ is the input-frequency (the frequency with which the data provider sends these chunks). In the example embodiment of FIG. 4, both the size of the input-chunk ($c_{in}$) and the input-frequency ($f_{in}$) are 60 seconds. FIG. 6 illustrates a similar example, though in a different manner. The probe data point timestamps are plotted along the x-axis, and the probe data point release times along the y-axis. Then the natural latency (e.g., the difference between a probe data point's release time and its timestamp) of every probe is naturally illustrated by its distance on the plot to the line y=x. The latency of a chunk is defined herein as the maximal latency of its probe data points, hence it is equal to the input-chunk frequency. The plot of FIG. 6 includes two trajectories, a $1^{st}$ vehicle trajectory (gray, round line points) and a $2^{nd}$ vehicle trajectory (black, square line points). A vehicle associated with the $1^{st}$ vehicle trajectory started generating probe data points at time $t_0^1=0$ and sends $c_{in}=60$ seconds of probes every $f_{in}=60$ seconds at the offset of $t_0^2=0$ of every minute. While the vehicle associated with the blue trajectory at some point to =0 in the past, before time 0:00, sends a chunk of size $c_{in}=60$ probe data points with frequency of $f_{in}=60$ seconds starting at the offset of $o^2=20$ seconds of every minute. Note that in the illustrated example, these offsets $o^1$ and $o^2$ manifest themselves on both y-axis as release time-projections and on x-axis as the projections of start- and end-probes of each input-chunk.

This data is anonymized by splitting each trajectory into sub-trajectories of length s=90 seconds with gap size g=40 seconds in between and this data is sent to the consumer (e.g., the location-based service provider) as soon as it has been processed. For ease of explanation, it is assumed that the processing time is negligible, where constant processing time delay $t_{processing}$ would simply manifest itself as a shift of $t_{processing}$. FIG. 7 illustrates the processing resulting data output and its timing. The pattern of the offsets, illustrated as the gray ($1^{st}$ vehicle) and black ($2^{nd}$ vehicle) dots on the axes in FIG. 7, manifests itself: (a) on the x-axis as the projection of the inner break-points within each sub-trajectory (the points where one chunk ends and another begins, indicated by a sudden "jump" in latency, with those pairs of points connected with almost vertical lines); and (b) on the y-axis as described above.

Embodiments described herein enhance privacy through reducing potential hints to an adversary by altering: the pattern of start-times of the chunks; the size of the chunks; the frequency of the chunks; and adding a random delay before releasing chunks of data. Provided below are three methods of implementing these privacy enhancements, each tailored to the quality of the input data and a trade-off between additional latency introduced by an anonymization technique and possible increase of implementation complexity on the side of the data consumer.

The first method is using regular size and regular frequency re-chunking. Probe data is repackaged in a regular way and, if necessary, a random delay is added before release of the data. Contrary to the basic splitting and gapping method described above, the pattern of starts of full chunks is not based on the start time of the original trajectory, but on the sub-trajectory start times. Every time a sub-trajectory begins with a remainder of a chunk (e.g., when a chunk begins with a gap) that is shorter than cm, the transmission is delayed by $f_{in}$ (e.g., until the next chunk is released), a sequence of first cm data is released in a transmission in such a way that every sub-trajectory that is longer than the length of a full chunk cm always starts with a transmission of a full chunk followed by delay, followed by the next chunk. In this manner, the inner break-points within the sub-trajectories originating from the same trajectory stop having the same offset. The difference between the first and last points of a trajectory are shown in FIG. 8. FIG. 8 illustrates re-chunking with the same chunk size ($c_{out}=c_{in}=60$) and the same frequency ($f_{in}=f_{in}=60$). The chunking pattern manifests itself as a release time pattern on the y-axis. Before re-chunking, the last point of every chunk of the same trajectory had the same offset of minute 0 (e.g., every $1^{st}$ vehicle trajectory chunk ended on the $59^{th}$ second of every minute, and every $2^{nd}$ vehicle trajectory chunk ended on the $19^{th}$ second of every minute.

Using this re-chunking technique, the new chunks are still released with the same offset, such that embodiments introduce an additional random delay to the release time of each new chunk, as illustrated in FIG. 9. By adding a random delay to each new chunk, the original chunk release-time pattern is broken as evident on the y-axis. This process can be generalized to where the size $c_{out}$ and the frequency $f_{out}$ of the output chunks are not equal to the sizes of the input chunks or to each other. That is, instead of releasing sequences of probes of length $c_{in}$ every $f_{in}$ seconds, a sequence is released of length $c_{out}$ every $f_{out}$ seconds, where $c_{in} \neq c_{out}$ and/or $f_{in} \neq f_{out}$, such that $c_{out} \neq f_{out}$. FIG. 10 illustrates example embodiment where $c_{in}=f_{in}=60$ sec; $c_{out}=40$ sec; $f_{out}=60$ sec. FIG. 11 illustrates an example embodiment where $c_{in}=f_{in}=60$ sec; $c_{out}=f_{out}=40$ sec. FIG. 12 illustrates an example embodiment where $c_{in}=f_{in}=60$ sec; $c_{out}=f_{out}=45$ sec. FIG. 13 illustrates an example embodiment where $c_{in}=f_{in}=60$ sec; $c_{out}=f_{out}=30$ sec. FIG. 14 illustrates an example embodiment where $c_{in}=f_{in}=60$ sec; $c_{out}=f_{out}=10$ sec. FIG. 15 illustrates an example embodiment where $c_{in}=f_{in}=60$ sec; $c_{out}=f_{out}=1$ sec.

As depicted in the example embodiments of FIGS. 10-15, sending data in smaller packages renders the release pattern harder to trace to the original trajectory, though an additional random delay can be added if necessary. With careful calculation of the delay of the first chunk for the case where $c_{out}=f_{out}$, the total latency is ensured not to exceed $c_{in}+c_{out}+D$, where D is the upper bound for the random delay.

The second method of enhancing privacy through reducing potential hints to an adversary includes individual probe delay data release. According to this method, each probe data point is released individually with the same latency with respect to its timestamp. For instance, if the processing time is $t_{processing}$, each point can be released at point "p" at time $t_{release}$=timestamp(p)+$c_{in}$+$t_{processing}$. In this manner the real-time data release is mimicked with a delay of $c_{in}$+$t_{processing}$. The data therefore includes no compromising information introduced by chunking and has optimal maximum latency. Further, while processing time may be negligible and may be assumed negligible, by setting $t_{release}$=timestamp(p)+$c_{in}$, extra delay to the data is avoided without any compromise to privacy. FIG. 16 depicts real-time output, whereas FIG. 17 depicts the output of FIG. 16 with each point delayed by $c_{in}$ ($t_{processing}$=0 assumption), and FIG. 18 depicts the data with $t_{processing}$>0 processing time.

The third method of enhancing privacy through reducing potential hints to an adversary includes budget-tailored randomized re-chunking. Instead of repackaging data in a regular manner, data release is rearranged as described herein. Provided a data consumer can tolerate the latency of at most B seconds in addition to the latency of cm already introduced by the data producer, a probe point p of a sub-trajectory can be delayed by at most $c_{in}$-($t_{release}$(p)-timestamp(p))+B seconds. FIG. 19 illustrates a shaded region 610 depicting how much each of the points of the sub-trajectory can be shifted vertically (delayed) without violating the latency constraints.

A random number $x \leq B/2$ can be generated to be the size of the end chunk that would be delayed and release at the next chunk. The last n-seconds of each chunk in the sub-trajectory are delayed until the next chunk. Another random number is generated $d \leq B/2$ as a random delay to the entire trajectory. This randomization occurs once per trajectory, between the first and second chunks, and the replicated forward for all of the chunks in the same trajectory. FIGS. 19 and 20 illustrate an example embodiment of budget-tailored re-chunking. In FIG. 19, two random numbers are generated:

$$x \leq \min(\frac{B}{2}, \text{timestamp(end of 1st chunk)} - \text{timestamp(sub-trajectory\_start)})$$

$$d \leq \frac{B}{2}$$

where x would define the size of the tail of the first chunk that get delayed and released with the next chunk, and d defines the random delay for the whole sub-trajectory. In FIG. 20, the sub-trajectory is updated by releasing the x-sized tail of the first chunk with the next chunk and delaying the whole trajectory by d.

Embodiments described herein improve the anonymity of trajectory data provided to location-based service providers by further obfuscating trajectory data that has been split and gapped through the use of re-chunking of the data and introducing a random delay in transmission. As detailed above, the re-chunking can be regular re-chunking or budget tailored re-chunking as appropriate, and may include individual probe delay data release. These techniques reduce the likelihood of an adversary associating trajectories with a source by eliminating clues that an adversary may use to re-associate trajectory data.

FIG. 21 illustrates a flowchart depicting methods according to an example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 21 illustrates a method of anonymizing trajectories of mobile devices, and more particularly, enhancing the anonymization of trajectories that are segmented and gapped by introducing additional anonymizing factors that render it difficult to determine a source of the trajectory. In the illustrated embodiment, an input chunk of probe data points spanning an input duration and representing an input portion of a trajectory is received at 610. The set of probe data points may be received, for example, by an OEM 104 from a vehicle or mobile device 114. The probe data points include at least a location (e.g., latitude and longitude) and a time stamp. Based, at least in part on the input chunk of probe data points, an output chunk of one or more probe data points spanning an output duration different from the input duration is generated at 620. The first input portion of the trajectory and the output portion of the trajectory share at least a common portion of the trajectory. Said differently, while the first input portion of the trajectory and the output portion of the trajectory may differ in terms of duration (length) and may capture different portions of the trajectory, they share at least one probe data point between them. The output chunk of one or more probe data points is provided to a location-based service provider at 630, where the location-based service provider provides at least one service based, at least in part, on the trajectory.

In an example embodiment, an apparatus for performing the method of FIG. 21 above may comprise a processor (e.g., the processor 202) configured to perform some or each of the operations (610-630) described above. The processor may, for example, be configured to perform the operations (610-630) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 610-630 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:

receive an input chunk of probe data points, wherein the input chunk includes probe data points spanning an input duration, wherein the input chunk of probe data points represents at least a first input portion of a trajectory;

generate, based at least in part on the input chunk of probe data points, an output chunk of one or more probe data points, wherein the output chunk includes one or more probe data points spanning an output duration, wherein the output duration is greater than the input duration, wherein the output chunk of one or more probe data points represents at least an output portion of the trajectory, wherein the first input portion of the trajectory and the output portion of the trajectory share at least a common portion of the trajectory; and provide the output chunk of one or more probe data points to a location-based service provider after introduction and elapsing of a randomized response delay, wherein the location-based service provider provides at least one service based, at least in part, on the trajectory, wherein the input chunk of probe data points comprises a starting probe data point and an ending probe data point, wherein the output chunk of one or more probe data points includes at least one different starting probe data point or ending probe data point.

2. The apparatus of claim 1, wherein the delay comprises a delay less than a latency defined by the location-based service provider.

3. The apparatus of claim 1, wherein the output chunk of one or more probe data points comprises an output chunk of one probe data point, and wherein the output chunk of one probe data point is provided at a release time equal to a timestamp of the one probe data point added to the input duration and a processing time duration.

4. The apparatus of claim 1, wherein the input chunk of probe data points comprises a first input chunk of probe data points, wherein the apparatus is further caused to:

receive a second input chunk of probe data points, wherein the second input chunk includes probe data points spanning the input duration, wherein the second input chunk of probe data points represents at least a second input portion of the trajectory;

wherein causing the apparatus to generate the output chunk of one or more probe data points, further comprises causing the apparatus to generate the output chunk of one or more probe data points based, at least in part, on the first input chunk of probe data points and the second input chunk of probe data points, wherein the output chunk of one or more probe data points comprises at least one probe data point from each of the first input chunk of probe data points and the second input chunk of probe data points.

5. The apparatus of claim 4, wherein the output chunk includes less than all of the probe data points from at least one of the first input chunk of probe data points and the second input chunk of probe data points.

6. The apparatus of claim 1, wherein the input chunk of probe data points is received from a mobile device, and wherein the location-based service provider provides at least one location-based service to at least one other mobile device.

7. A method comprising:

receiving an input chunk of probe data points, wherein the input chunk includes probe data points spanning an input duration, wherein the input chunk of probe data points represents at least a first input portion of a trajectory;

generating, based at least in part on the input chunk of probe data points, an output chunk of one or more probe data points, wherein the output chunk includes one or more probe data points spanning an output duration, wherein the output duration is greater than the input duration, wherein the output chunk of one or more probe data points represents at least an output portion of the trajectory, wherein the first input portion of the trajectory and the output portion of the trajectory share at least a common portion of the trajectory; and providing the output chunk of one or more probe data points to a location-based service provider after introduction and elapsing of a randomized response delay, wherein the location-based service provider provides at least one service based, at least in part, on the trajectory, wherein the input chunk of probe data points comprises a starting probe data point and an ending probe data point, wherein the output chunk of one or more probe data points includes at least one different starting probe data point or ending probe data point.

8. The method of claim 7, wherein the input chunk of probe data points comprises a first input chunk of probe data points, the method further comprising:

receiving a second input chunk of probe data points, wherein the second input chunk includes probe data points spanning the input duration, wherein the second input chunk of probe data points represents at least a second input portion of the trajectory;

wherein generating the output chunk of one or more probe data points further comprises generating the output chunk of one or more probe data points based, at least in part, on the first input chunk of probe data points and the second input chunk of probe data points, wherein the output chunk of one or more probe data points comprises at least one probe data point from each of the first input chunk of probe data points and the second input chunk of probe data points.

9. The method of claim 7, wherein the output chunk of one or more probe data points comprises an output chunk of one probe data point, and wherein the output chunk of one probe data point is provided at a release time equal to a timestamp of the one probe data point added to the input duration and a processing time duration.

10. The method of claim 8, wherein the output chunk includes less than all of the probe data points from at least one of the first input chunk of probe data points and the second input chunk of probe data points.

11. The method of claim 7, wherein the input chunk of probe data points is received from a mobile device, and wherein the location-based service provider provides at least one location-based service to at least one other mobile device.

12. A computer program product comprising at least one non-transitory computer-readable storage medium having computer-executable program code portions stored therein, the computer-executable program code portions comprising program code instructions configured to:

receive an input chunk of probe data points, wherein the input chunk includes probe data points spanning an input duration, wherein the input chunk of probe data points represents at least a first input portion of a trajectory;

generate, based at least in part on the input chunk of probe data points, an output chunk of one or more probe data points, wherein the output chunk includes one or more probe data points spanning an output duration wherein the output duration is greater than the input duration, wherein the input chunk of probe data points comprises a starting probe data point and an ending probe data point, wherein the output chunk of one or more probe data points includes at least one different starting probe data point or ending probe data point, wherein the output chunk of one or more probe data points represents at least an output portion of the trajectory, wherein the first input portion of the trajectory and the output portion of the trajectory share at least a common portion of the trajectory; and provide the output chunk of one or more probe data points to a location-based service provider after introduction and elapsing of a randomized response delay, wherein the location-based service provider provides at least one service based, at least in part, on the trajectory.

13. The computer program product of claim 12, wherein the output duration is different from the input duration.

14. The computer program product of claim 12, wherein the delay comprises a delay less than a latency defined by the location-based service provider.

15. The computer program product of claim 12, wherein the input chunk of probe data points comprises a first input chunk of probe data points, wherein the computer program product further comprises program code instructions to:

receive a second input chunk of probe data points, wherein the second input chunk includes probe data points spanning the input duration, wherein the second input chunk of probe data points represents at least a second input portion of the trajectory;

wherein the program code instructions to generate the output chunk of one or more probe data points, further comprise program code instructions to generate the output chunk of one or more probe data points based, at least in part, on the first input chunk of probe data points and the second input chunk of probe data points, wherein the output chunk of one or more probe data points comprises at least one probe data point from each of the first input chunk of probe data points and the second input chunk of probe data points.

* * * * *